(12) United States Patent
Kato

(10) Patent No.: US 6,632,110 B2
(45) Date of Patent: Oct. 14, 2003

(54) EXHAUST CATALYST FOR OUTBOARD MOTOR ENGINE

(75) Inventor: Masahiko Kato, Shizuoka (JP)

(73) Assignee: Yamaha Marine Kabushiki Kaisha, Shizuoka-ken (JP)

(*) Notice: Subject to any disclaimer, the term of this patent is extended or adjusted under 35 U.S.C. 154(b) by 91 days.

(21) Appl. No.: 09/834,827

(22) Filed: Apr. 13, 2001

(65) Prior Publication Data

US 2002/0034900 A1 Mar. 21, 2002

(30) Foreign Application Priority Data

Apr. 13, 2000 (JP) .................................... 2000-111549

(51) Int. Cl.⁷ .............................................. B63H 21/32
(52) U.S. Cl. ................................................... 440/89 H
(58) Field of Search ...................... 60/287, 288; 440/89

(56) References Cited

U.S. PATENT DOCUMENTS

| | | |
|---|---|---|
| 5,346,417 A | 9/1994 | Isogawa |
| 5,433,634 A | 7/1995 | Nakayama et al. |
| 5,554,057 A | 9/1996 | Abe et al. |
| 5,575,699 A | 11/1996 | Isogawa et al. |
| 5,595,516 A | 1/1997 | Matsumoto et al. |
| 5,809,776 A * | 9/1998 | Holtermann et al. .......... 60/288 |
| 5,911,610 A | 6/1999 | Fujimoto |

* cited by examiner

Primary Examiner—Ed Swinehart
(74) Attorney, Agent, or Firm—Knobbe Martens Olson & Bear LLP

(57) ABSTRACT

An exhaust catalyst assembly for an outboard motor includes a branched passage connecting the main exhaust passages with a catalyst device. The outboard motor can include various exhaust passages and features for controlling and discharging the flow to and from the catalyst device.

23 Claims, 23 Drawing Sheets

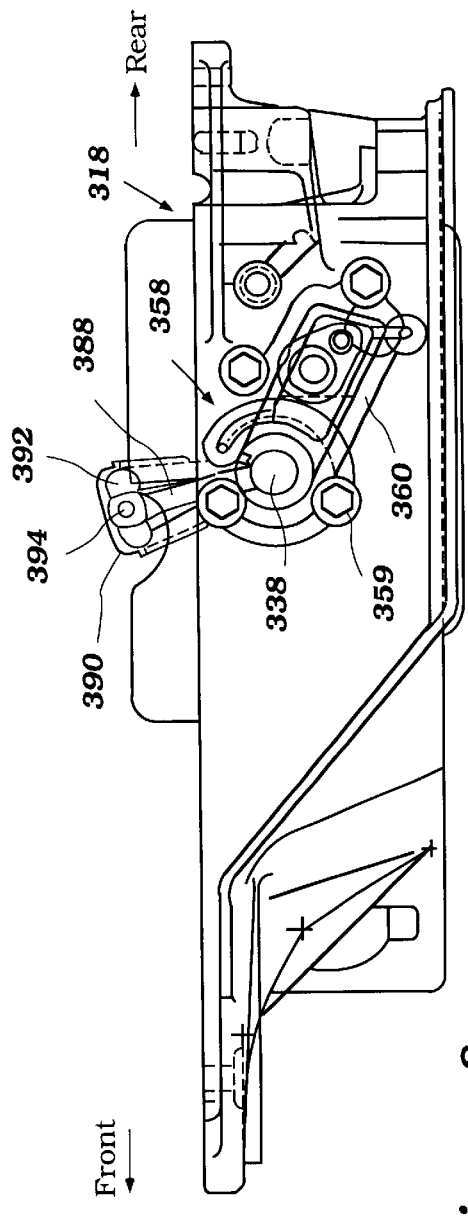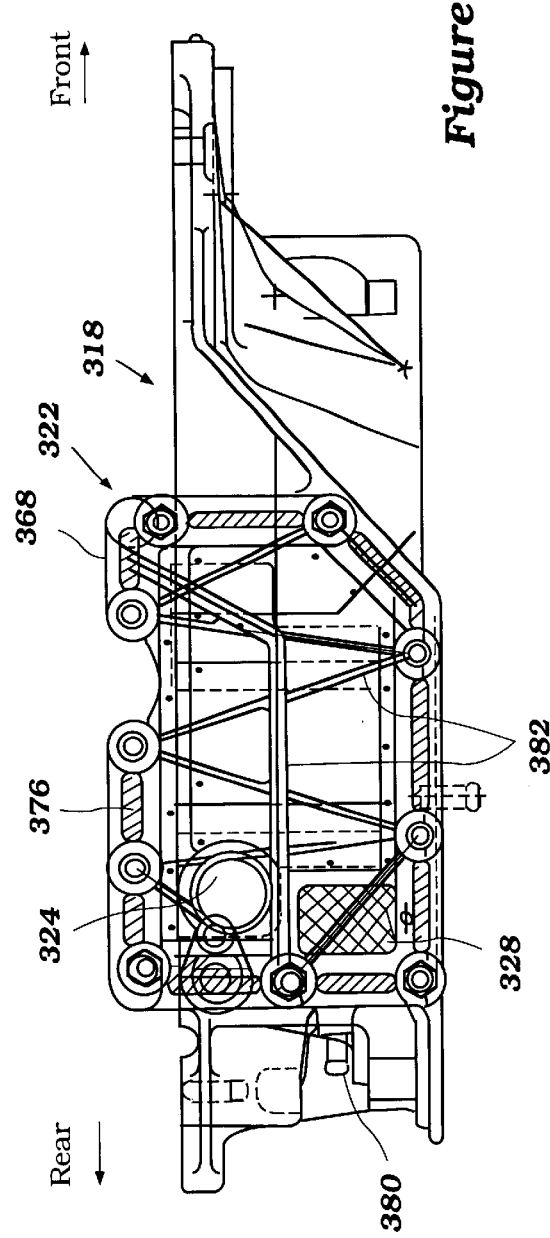

EXHAUST CATALYST FOR OUTBOARD MOTOR ENGINE

This application is based on and claims priority to Japanese Patent Application No. 2000-111549, filed Apr. 13, 2000, the entire contents of which is hereby expressly incorporated by reference.

BACKGROUND OF THE INVENTION

1. Field of the Invention

The present invention is directed to marine propulsion engines, such as outboard motors, and the exhaust systems therefor.

2. Description of Related Art

Outboard motors present a number of challenges to the designer. One such challenge is the very compact nature of an outboard motor. An outboard motor generally includes a powerhead that consists of a powering internal combustion engine and a surrounding protective cowling. A drive shaft housing and a lower unit depends from the powerhead. The drive shaft housing and lower unit journals a drive shaft that is driven by the engine. A transmission, which drives a propulsion device in the lower unit, thereby propels an associated watercraft.

One of the prime design considerations and problems in connection with outboard motors is the provision of an adequate exhaust system that permits relatively free breathing, good silencing, and also which ensures that excess heat is not generated and transmitted to other components of the outboard motor. Silencing an outboard motor presents a significant problem in that the length of the exhaust system is substantially limited by the compact nature of the structure. Generally, it has been known to utilize one or more expansion chambers formed in the drive shaft housing and lower unit for assisting in the silencing of the exhaust gases.

It is has also been known in outboard motor construction to discharge the exhaust gases to the atmosphere through the body of water in which the watercraft is operating, at least when the engine is operating at higher engine speeds. By utilizing an underwater exhaust gas discharge, the silencing of the exhaust gases can be augmented.

However, the use of the underwater discharge provides certain problems in that there is a concern that water may be ingested into the engine through the exhaust system. This is a particular problem in connection with two-cycle engines because of the firing impulses and the existence of negative pressures in the exhaust under some circumstances during operation. It has been proposed, therefore, to employ a watertrap arrangement that assists in ensuring against ingestion of water into the engine through the exhaust system.

Additionally, in the interest of obtaining good exhaust emission control, catalysts have been proposed for use in the exhaust system. The catalyst, however, causes additional resistance to the flow of exhaust gases through the exhaust system. Additionally, the catalyst should be protected from water so as to avoid damage. This presents other problems in connection with the location of the related components. It has been proposed also to position the catalyst at an upstream location from the watertrap device so as to ensure protection from water.

For example, with reference to FIGS. 1 and 2, an outboard motor 10 which includes a known exhaust system 12 is shown therein. As is typical with outboard motor practice, the outboard motor 10 includes a powerhead portion 14 with a drive shaft housing and lower unit portion 16 which depends from the powerhead 14.

The powerhead 14 includes an internal combustion engine 18. The engine 18 is surrounded by a protective cowling, which includes an upper cowling portion (not shown) and a lower tray portion 20.

The engine 18 is mounted in the outboard motor 10 such that its crankshaft 22 rotates about a vertically-extending axis. The crankshaft 22 drives a drive shaft 24 which is journaled within the drive shaft housing and lower unit portion 16.

The drive shaft 24 depends into the lower unit portion where it drives a propeller 26 via a conventional bevel gear reversing transmission 28. The propeller 26 is affixed to a propeller shaft 30 which is driven by the transmission 28. As such, as the drive shaft rotates and drives the transmission 28, the propeller 26 rotates to thereby propel an associated watercraft through the body of water in which it operates.

The drive shaft housing and lower unit 16 includes an upper case portion 32 which is generally open at its upper end. This open upper end is closed by an exhaust guideplate 34 which also supports the engine 18.

A pair of damper members 36 support the exhaust guideplate 34 and the upper case 32, respectively, relative to a steering or "swivel" shaft 38. The steering shaft is supported by a bracket assembly 40 which, in turn, is connected to the transom of an associated watercraft in a known manner.

The exhaust system 12 of the engine 18 includes an exhaust manifold (not shown) which defines at least a portion of a main exhaust passage that extends from the combustion chambers of the engine 18 into an expansion chamber 42. The main exhaust passage extends through the exhaust guideplate 34 and through an outlet end 44 thereof. The expansion chamber 42 aids in quieting the noises traveling through the main exhaust passage along with the exhaust gases.

The exhaust system 12 also includes a catalyst device 46 disposed in an outlet 48 of the expansion chamber 42. The catalyst device 46 is positioned in the outlet 48 such that substantially all of the exhaust gases flowing into the outlet 48 from the expansion chamber 42 passes through the catalyst device 46. The outlet 48 of the expansion chamber 42 extends through the exhaust guideplate 34 into an upper or a "riser" exhaust passage 50.

With reference to FIG. 2, the riser portion 50 has a generally inverted U-shape. An outlet end 52 of the riser portion 50 connects to a further exhaust passage 54 which extends through the exhaust guideplate 34. An additional exhaust pipe 56 is connected to the exhaust passage 54 and extends downwardly through the upper case 32 toward the lower case 33.

With reference to FIG. 1, the lower case 33 includes a passage 58 which connects the exhaust pipe 56 with an exhaust discharge 60 which is positioned within the propeller 26.

Additionally, at least a portion of the exhaust system 12 is cooled by water drawn from the body of water in which the outboard motor 10 is operating. For example, the riser section 50 includes a cooling jacket 62. Additionally, the outboard motor 10 includes a temperature sensor 64 for sensing a temperature of the coolant flowing through the cooling jacket 62. The outboard motor 10 can also include an oxygen sensor 66 which includes an inner end exposed to the exhaust gases flowing through the riser pipe 50. The output from the oxygen sensor can be used to control an engine operating parameter such as those relating to fuel injection duration and timing and/or ignition timing.

In operation, exhaust gases generated in the combustion chambers within the engine 18 are directed downwardly by the main exhaust passage into the outlet end 44. Exhaust gases from the outlet end 44 flow into the expansion chamber 42 which thereby attenuates some of the noise associated with the exhaust gases.

All of the exhaust gases from the expansion chamber 42 flow through the catalyst device 46 and upwardly into the riser pipe 50. With reference to FIG. 2, exhaust gases flow upwardly into the riser portion 50 and laterally toward the port side of the outboard motor 10, then downwardly into the exhaust pipe 56. As shown in FIG. 1, exhaust gases from the exhaust pipe 56 flow into the exhaust passage 58 formed in the lower unit housing 33 and through the discharge 60 formed on the propeller 26. Thus, exhaust gases are further quieted by being discharged below the water surface level of the body of water in which the outboard motor 10 is being operated. Additionally, by directing the exhaust gases upwardly into the riser portion that is disposed above the exhaust guideplate 34, the riser portion 50 forms a watertrap which helps in preventing water from flowing upwardly through the exhaust pipe 56, through the riser pipe 50, and making contact with the catalyst device 46.

SUMMARY OF THE INVENTION

One aspect of the present invention involves the realization that an important benefit of the use of catalytic devices for marine engines is operative only during idling or low speed operation. In particular, marine engines without catalytic devices generate a significant amount of smoke during operation. Such smoke is caused by the adhesion of water molecules to unburned hydrocarbons in exhaust gases of the marine engine, such as an outboard motor. When such a marine engine associated with a watercraft, is operating at idle or low speed, the smoke generated with the exhaust gases tends to float in the vicinity of the watercraft, thereby creating an unpleasant environment for the passengers within the watercraft. In contrast, at high speed operation, sufficient wind is generated to flush the smoke associated with the exhaust gases rearwardly and away from the watercraft such that passengers do not notice such smoke.

In accordance with the present aspect of the invention, it has been discovered that while catalyst devices are particularly beneficial in eliminating unburned hydrocarbons and smoke generated during idling and low speed operation of a marine engine, such a benefit is moot during high speed operation. Thus, a marine engine can be provided with a lower capacity or smaller catalyst device which treats exhaust gases during idling that is not necessarily used to treat all of the exhaust gases during high speed operation.

In accordance with another aspect of the invention, an outboard motor includes an internal combustion engine with an engine body defining at least one combustion chamber. The outboard motor also includes a main exhaust passage configured to guide exhaust gases from the combustion chamber to an exterior of the engine body. The main exhaust passage includes an outlet end communicating with an expansion chamber. A branched exhaust passage extends from the main exhaust passage at a point upstream from the outlet end. The outboard motor also includes a catalytic device, wherein the branch passage connects the catalytic device with the main exhaust passage.

By including the catalytic device that is connected to the main exhaust passage by a branched exhaust passage, the outboard motor according to the present aspect of the invention can operate without forcing all of the exhaust gases to pass through the catalytic device. Thus, the outboard motor can operate with reduced back pressure in the exhaust system. Additionally, the outboard motor can operate, at low speeds, such as idling, for example, but without limitation, and direct all of the exhaust gases during such operation through the catalytic device, thereby preventing the generation of smoke. As such, a smaller catalytic device can be used, thereby reducing the weight and cost of the outboard motor.

In accordance with yet another aspect of the present invention, an outboard motor includes an engine having an engine body defining at least one combustion chamber. The outboard motor also includes an exhaust system comprising a main exhaust passage and an expansion chamber. The main exhaust passage includes an inlet end communicating with the combustion chamber and an outlet end communicating with the expansion chamber. An exhaust guideplate supports the engine above the expansion chamber. The main exhaust passage extends through the exhaust guideplate. An exhaust valve is supported by the exhaust plate and configured to control a flow of exhaust gases through the main exhaust passage.

By providing the outboard motor with a valve supported by the exhaust guideplate and configured to control the flow of exhaust gases through the main exhaust passage, the flow of exhaust gases through the exhaust system can be altered. For example, the exhaust valve can be opened under one operating condition and closed under another, as desired.

In accordance with yet another aspect of the present invention, an internal combustion engine having an engine body defines at least one combustion chamber. An exhaust manifold includes an inlet end receiving exhaust gases from the combustion chamber. A main exhaust passage is configured to guide exhaust gases from the exhaust manifold to the atmosphere. A branched exhaust passage includes an inlet end extending from the main exhaust passage. Additionally, the engine includes an exhaust valve disposed in the main exhaust passage downstream from the inlet end of the branched exhaust passage. The exhaust valve is configured to affect a relative proportion of exhaust gases flowing through the main exhaust passage and the branched exhaust passage.

According to a further aspect of the present invention, an internal combustion engine includes an engine body defining at least one combustion chamber. The engine also includes an exhaust system configured to discharge exhaust gases from the combustion chamber to the atmosphere. The exhaust system includes a catalyst device assembly comprising a catalyst housing and a cylindrical catalyst element having a longitudinal axis and being disposed in the housing. The housing includes a flange extending generally parallel to the longitudinal axis of the catalyst element.

These and other aspects of the present invention will become readily apparent to those skilled in the art from the following detailed description of the preferred embodiments having reference to the attached figures, the invention not being limited to any particular preferred embodiments disclosed.

Figure 1:
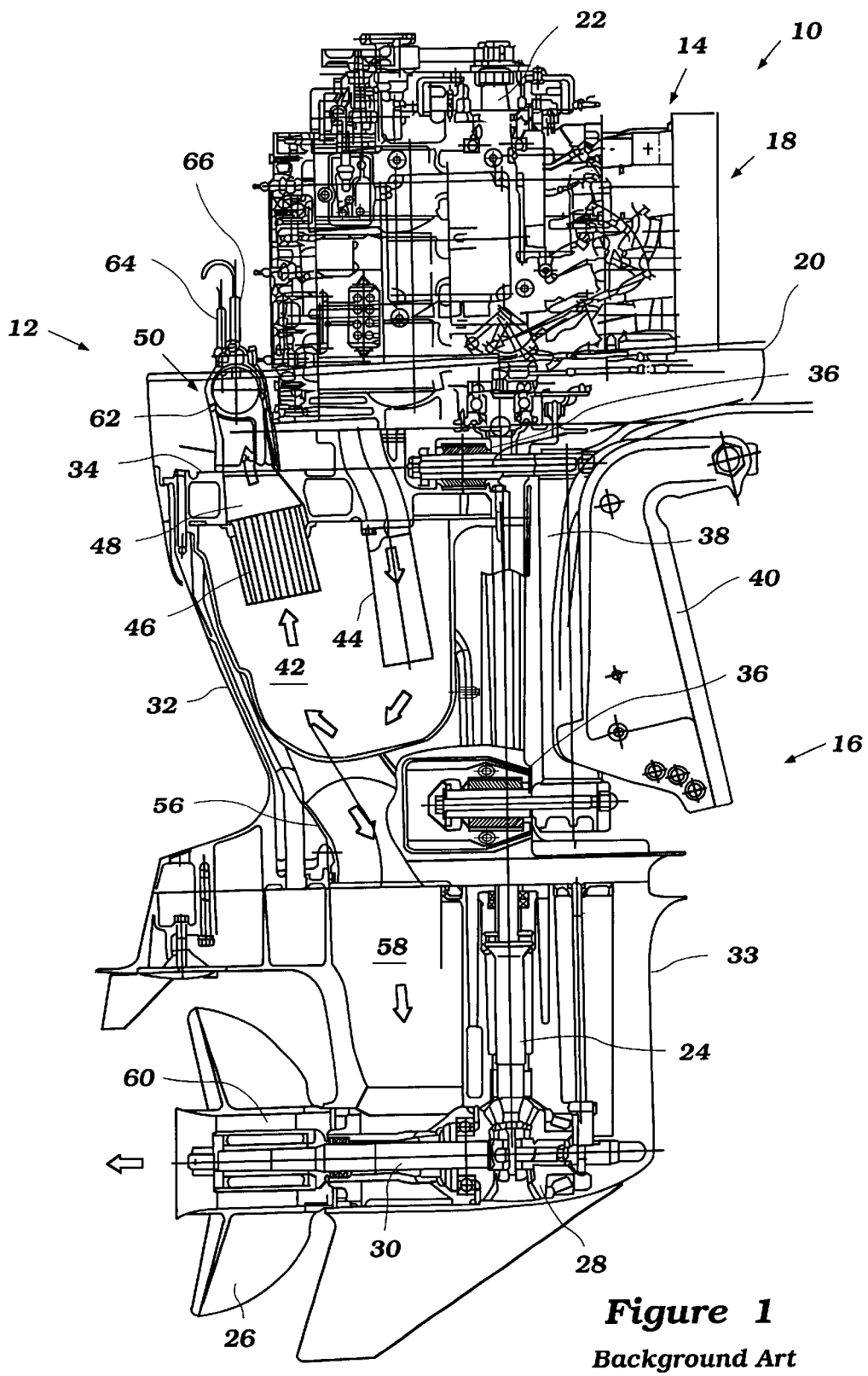
FIG. 1 is a side elevational and partial sectional view of an outboard motor having a known exhaust system, the upper cowling of the outboard motor being removed.
Figure 2:
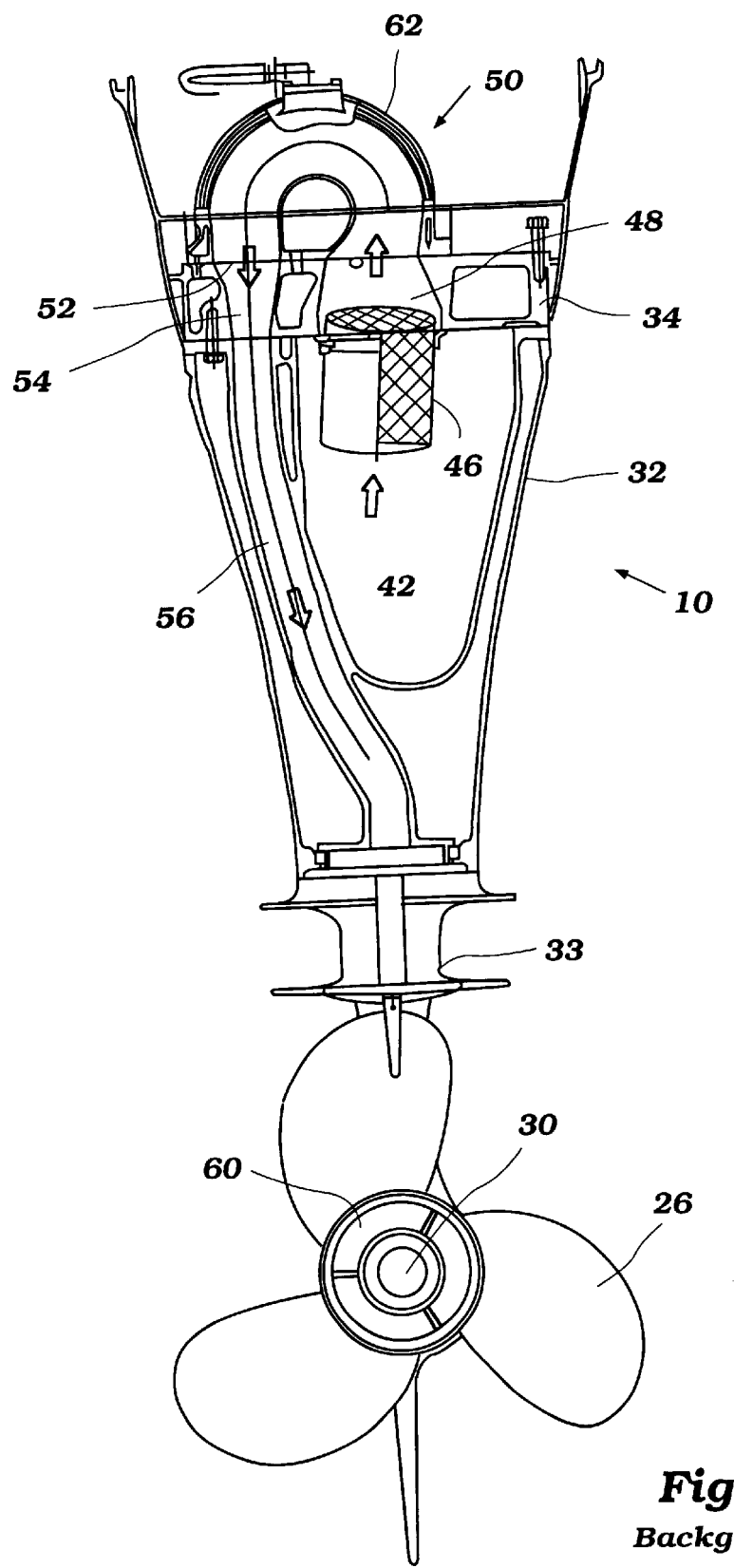
FIG. 2 is an enlarged partial rear elevational and partial sectional view of the outboard motor illustrated in FIG. 2.
Figure 3:
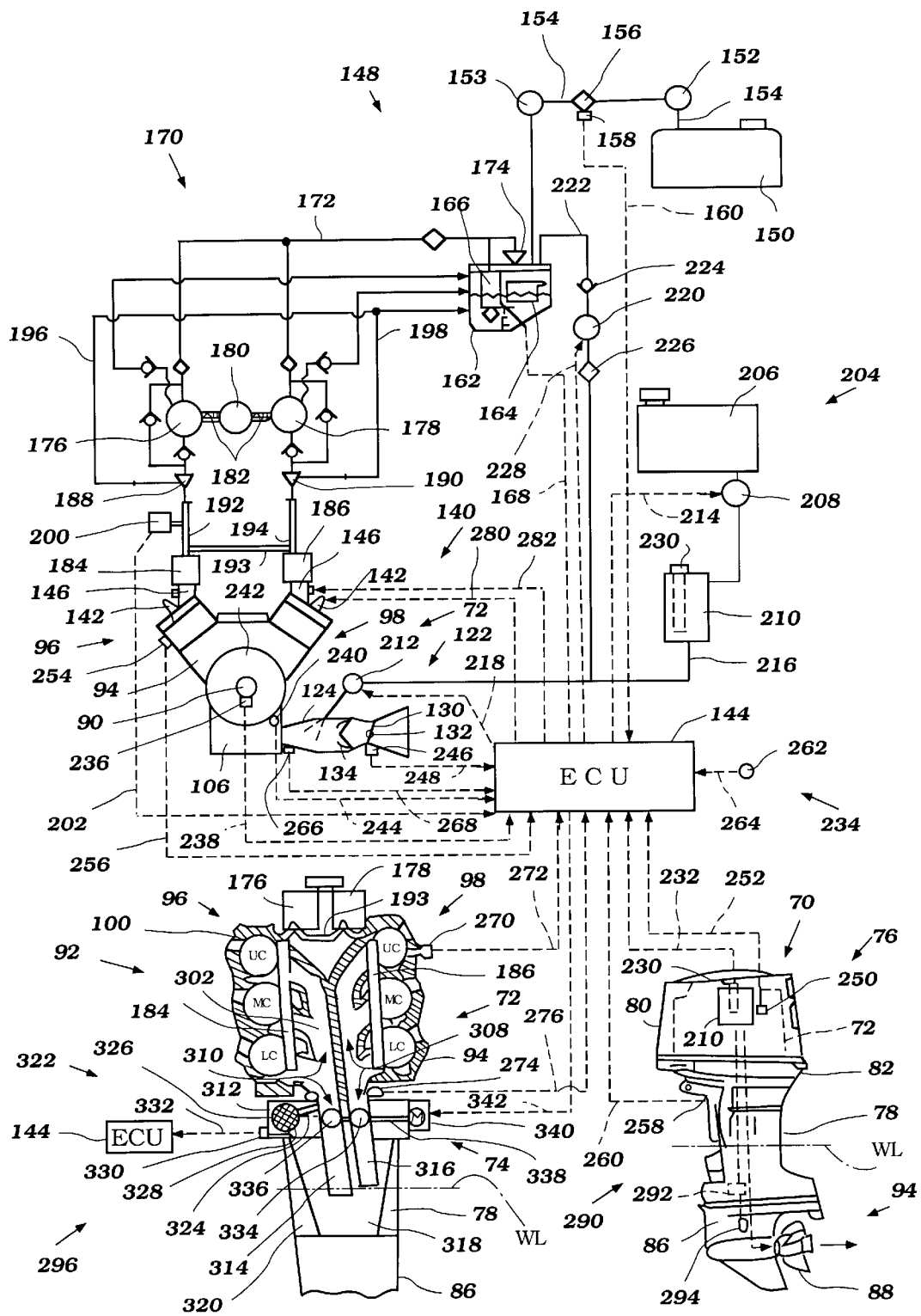
Figure 4:
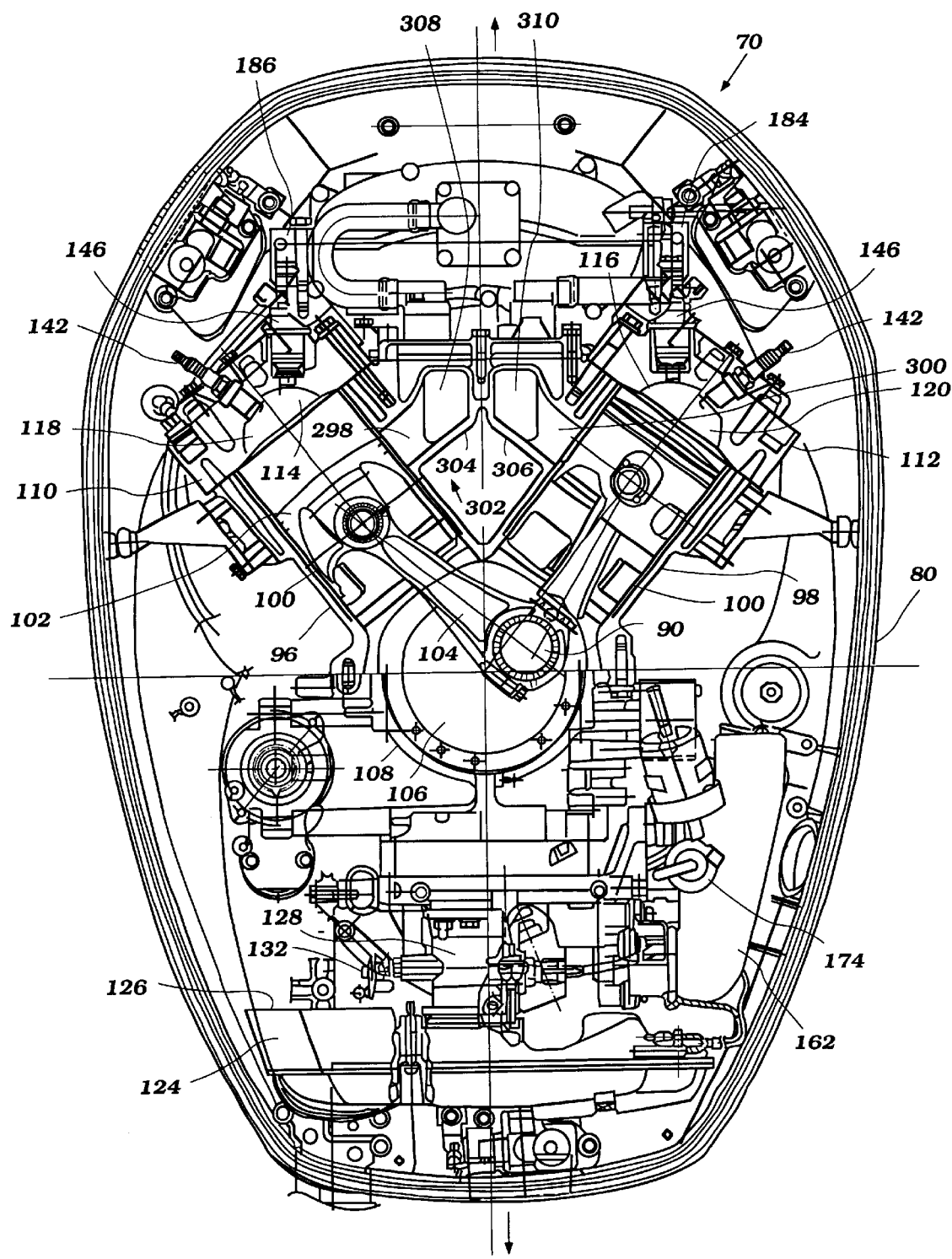
Figure 5:
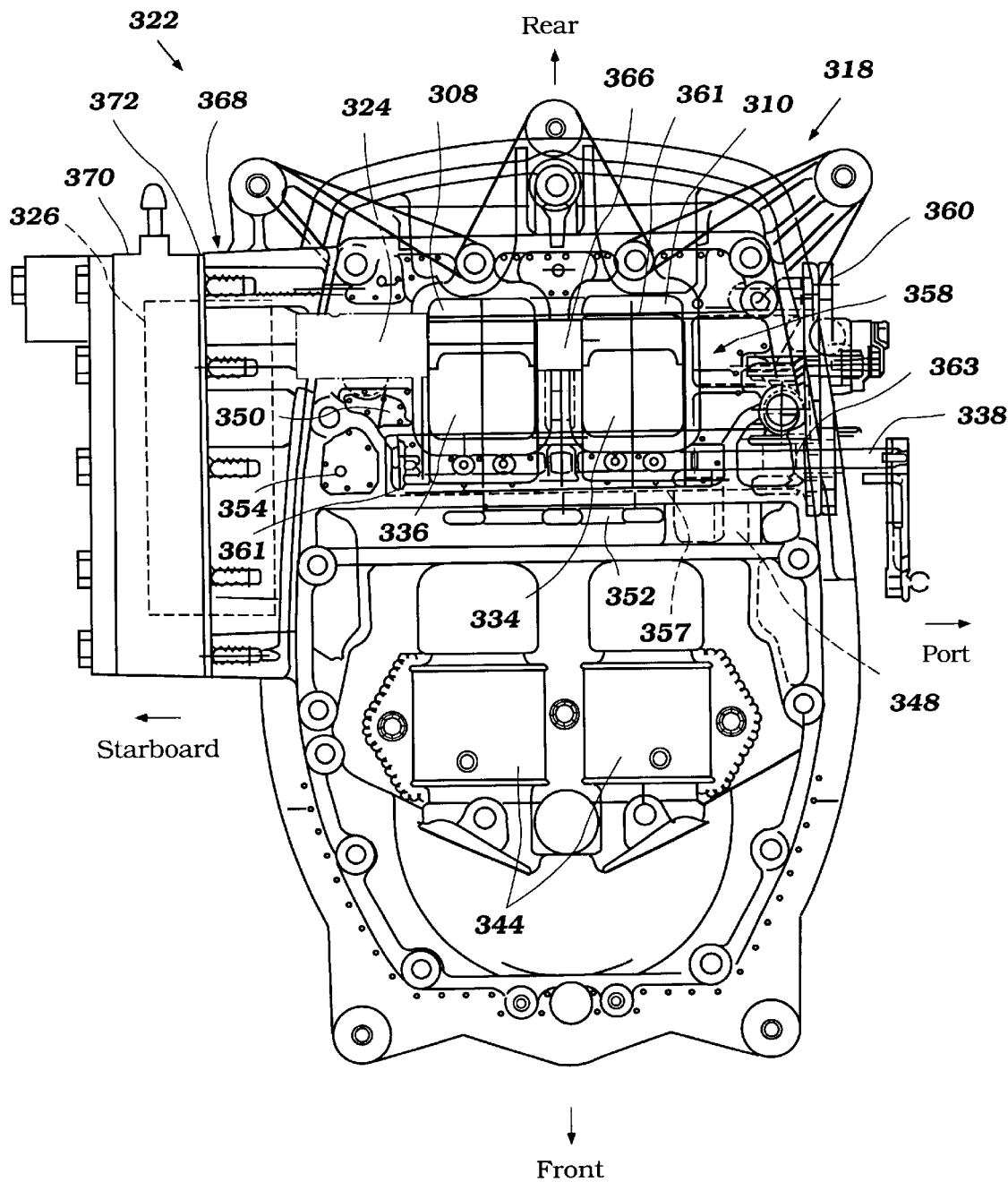
Figure 6:
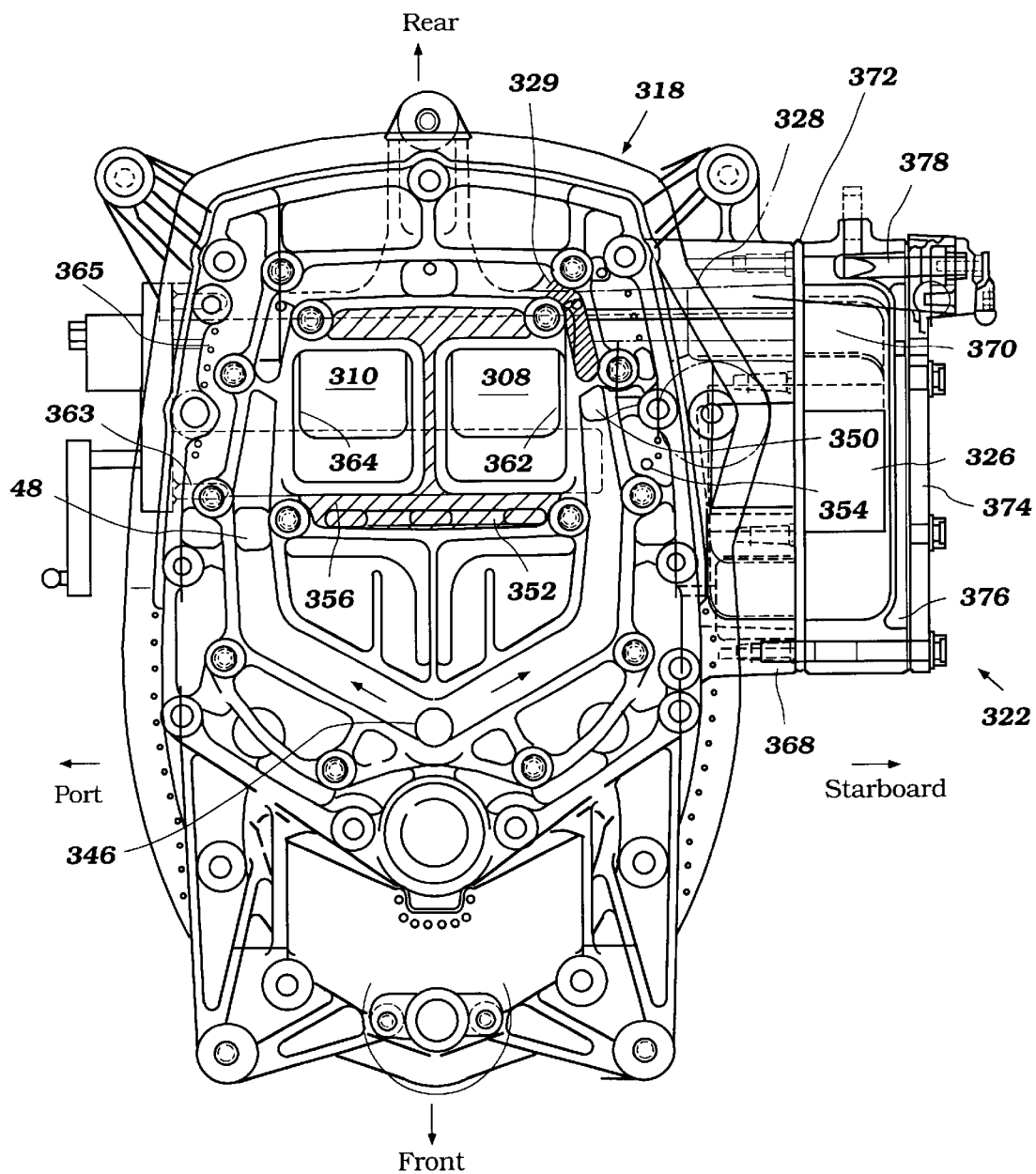
Figure 9:
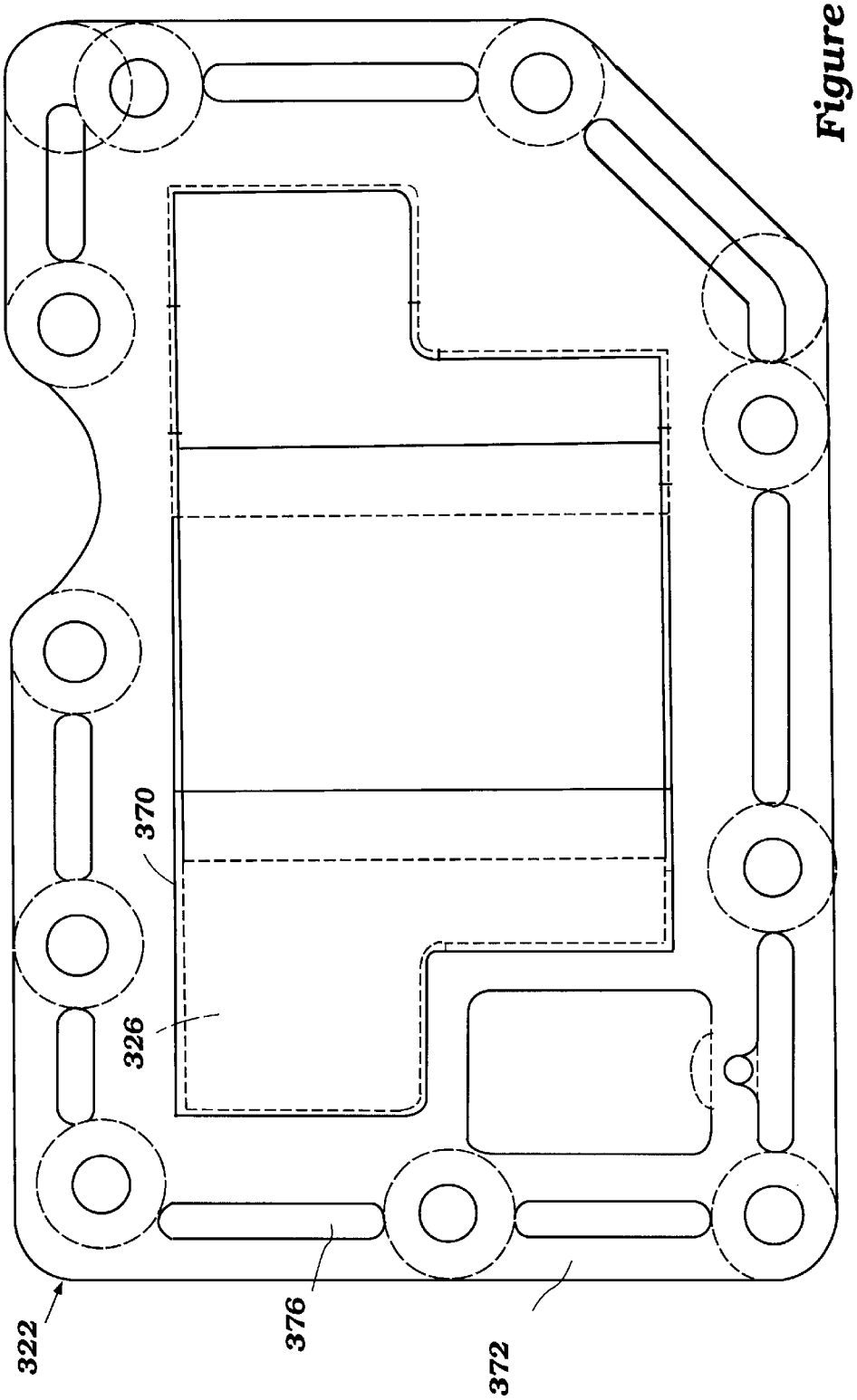
Figure 10:
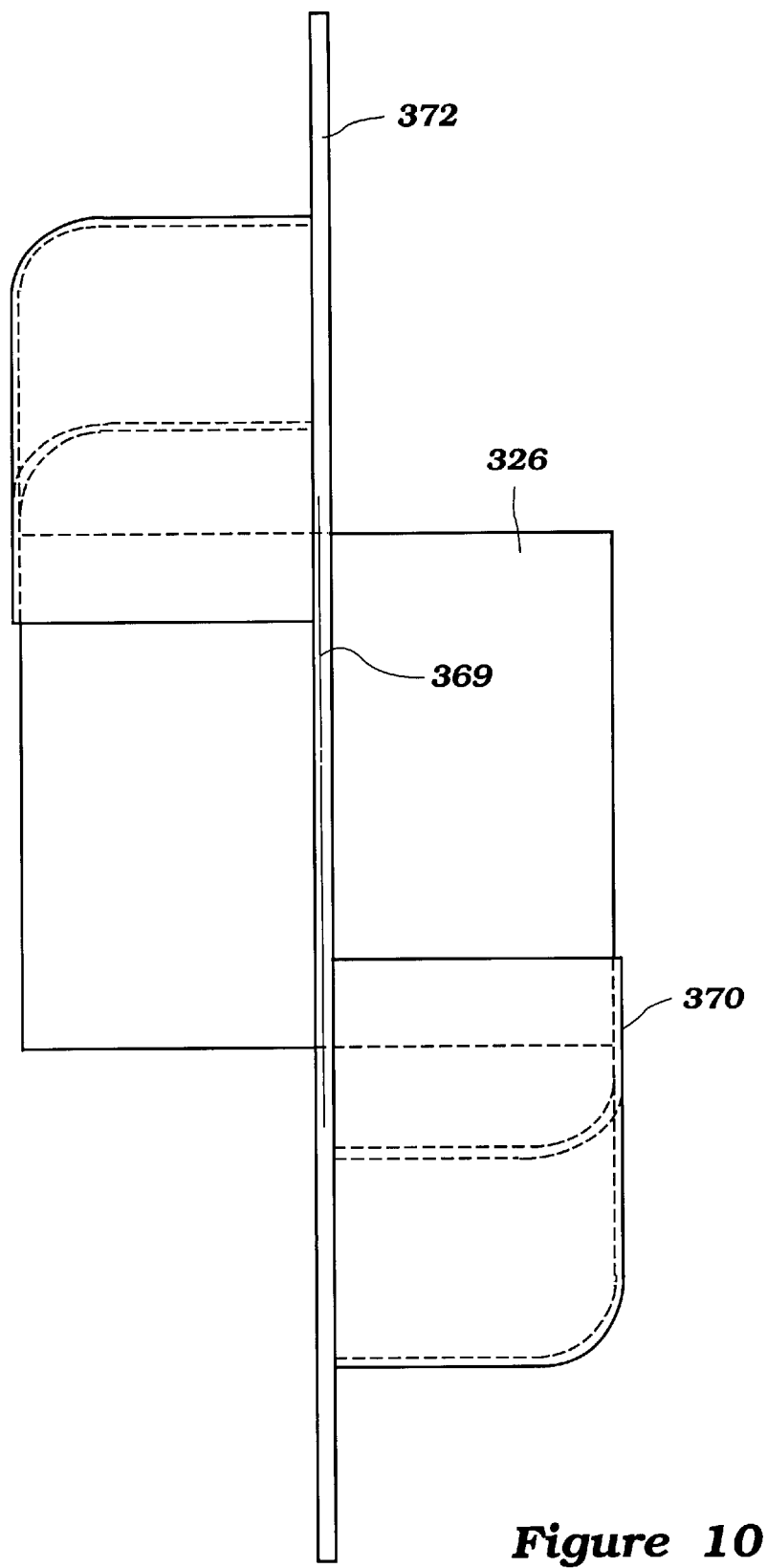
Figure 11:
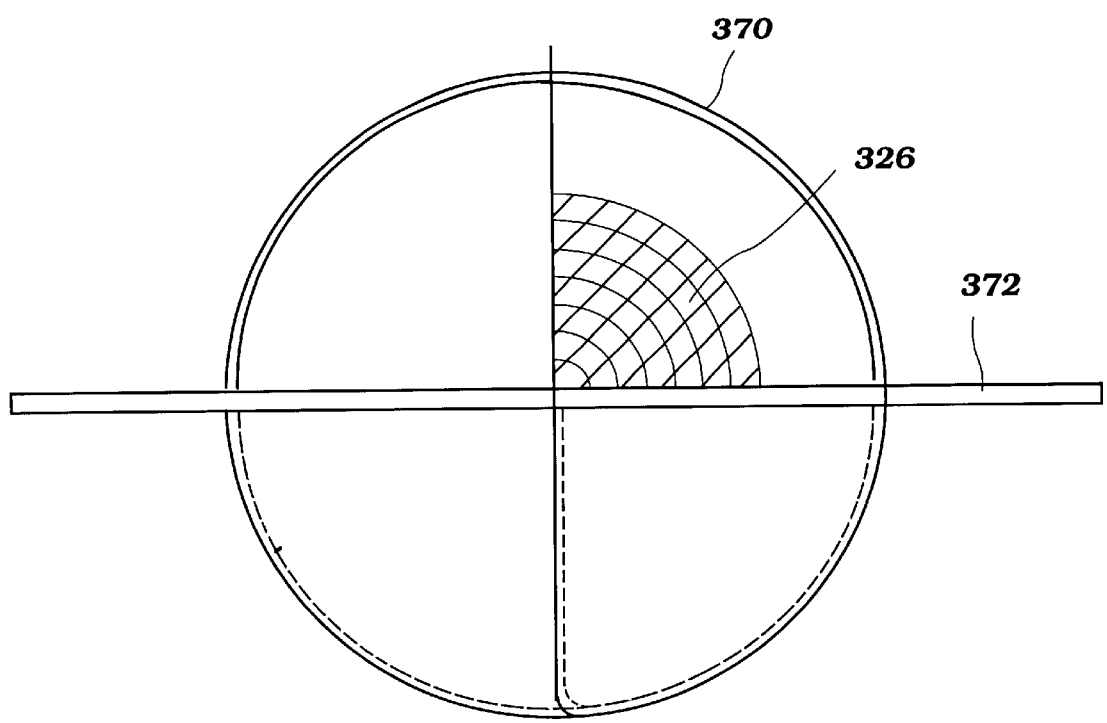
Figure 12:
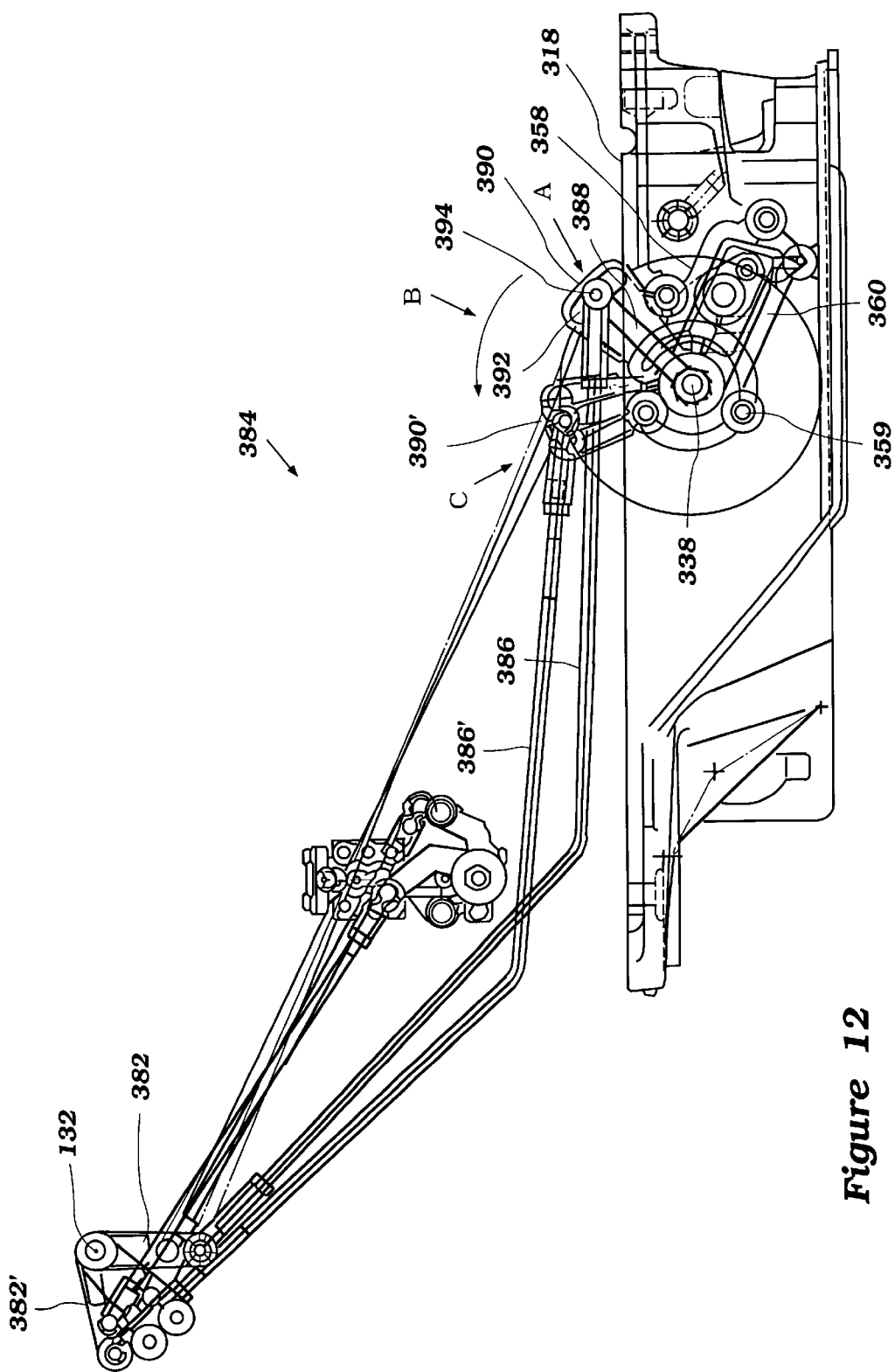
Figure 13:
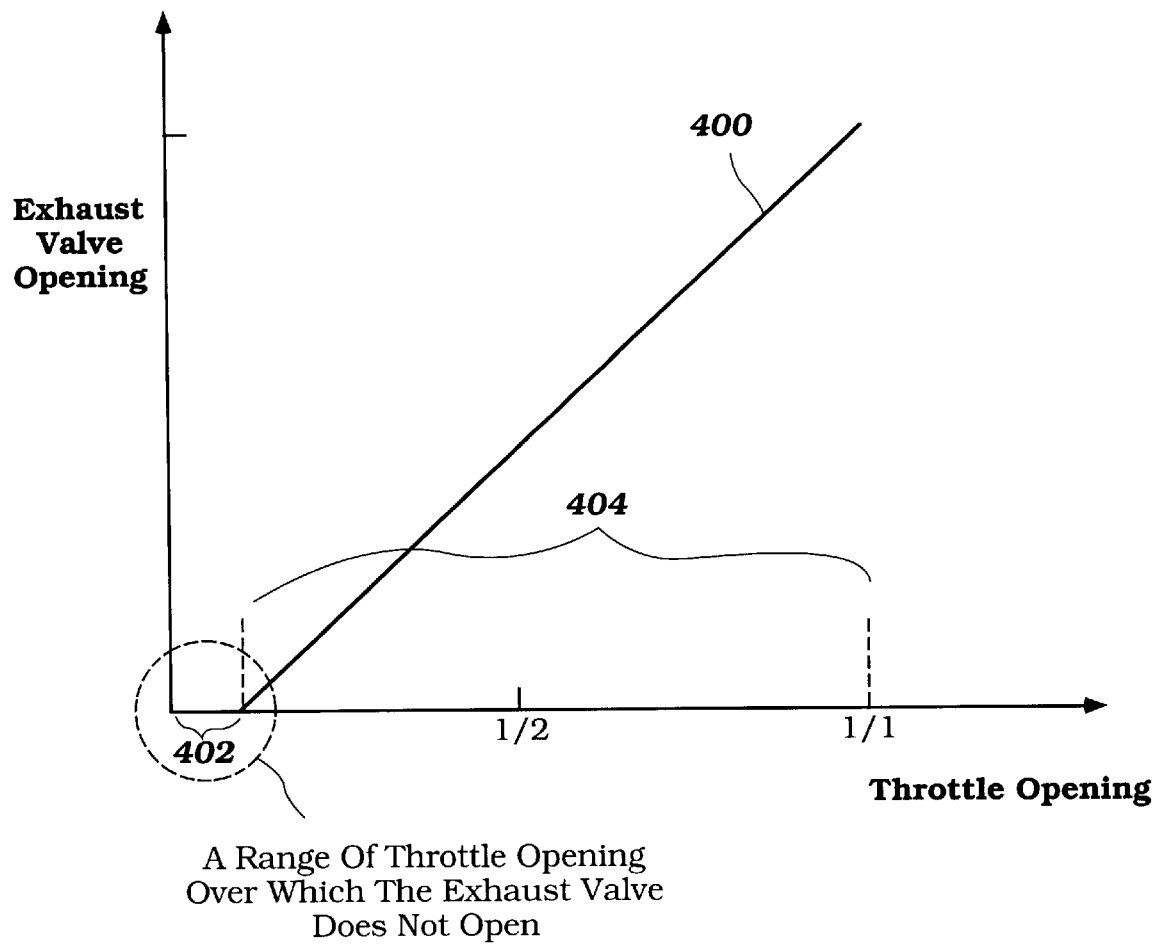
Figure 14:
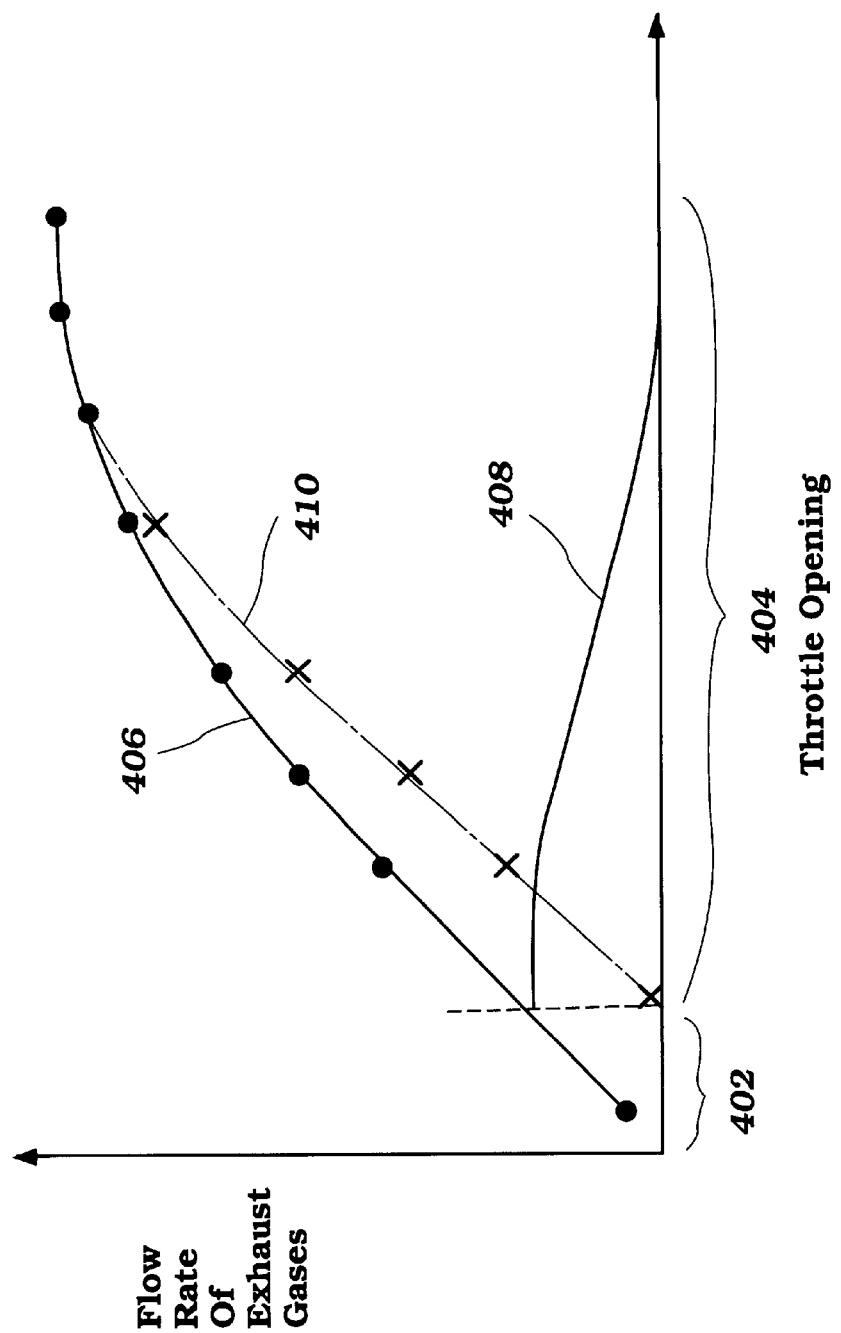
Figure 15:
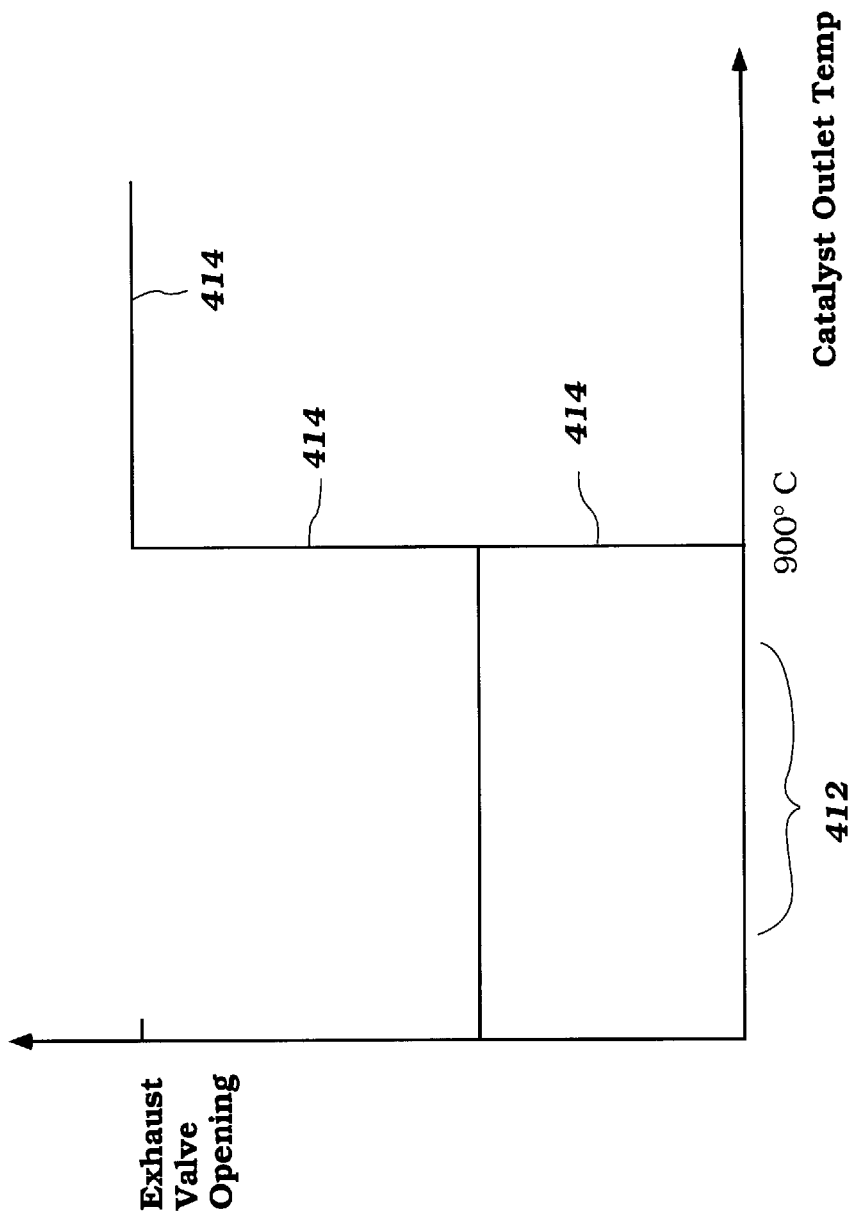
Figure 16:
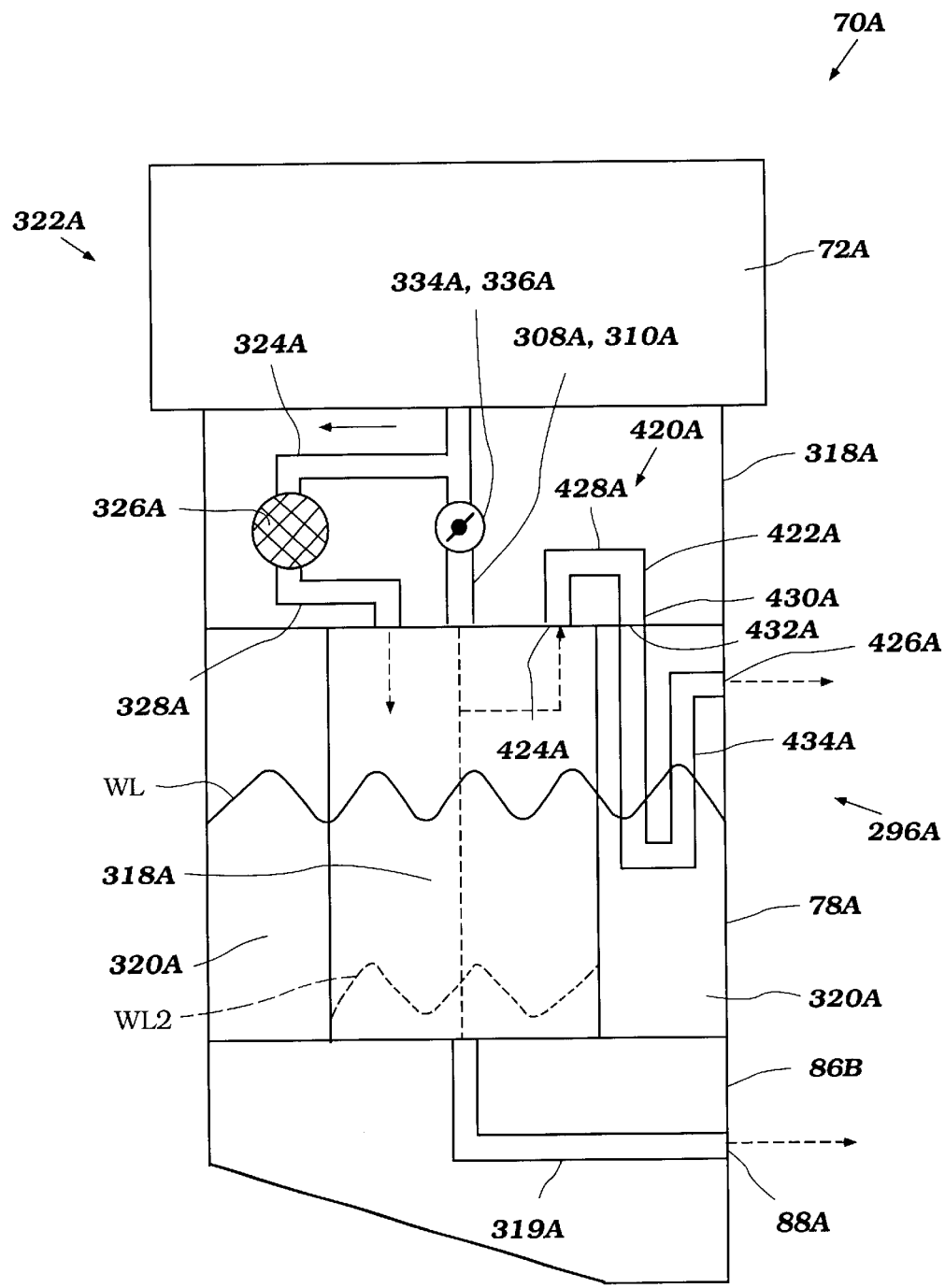
Figure 17:
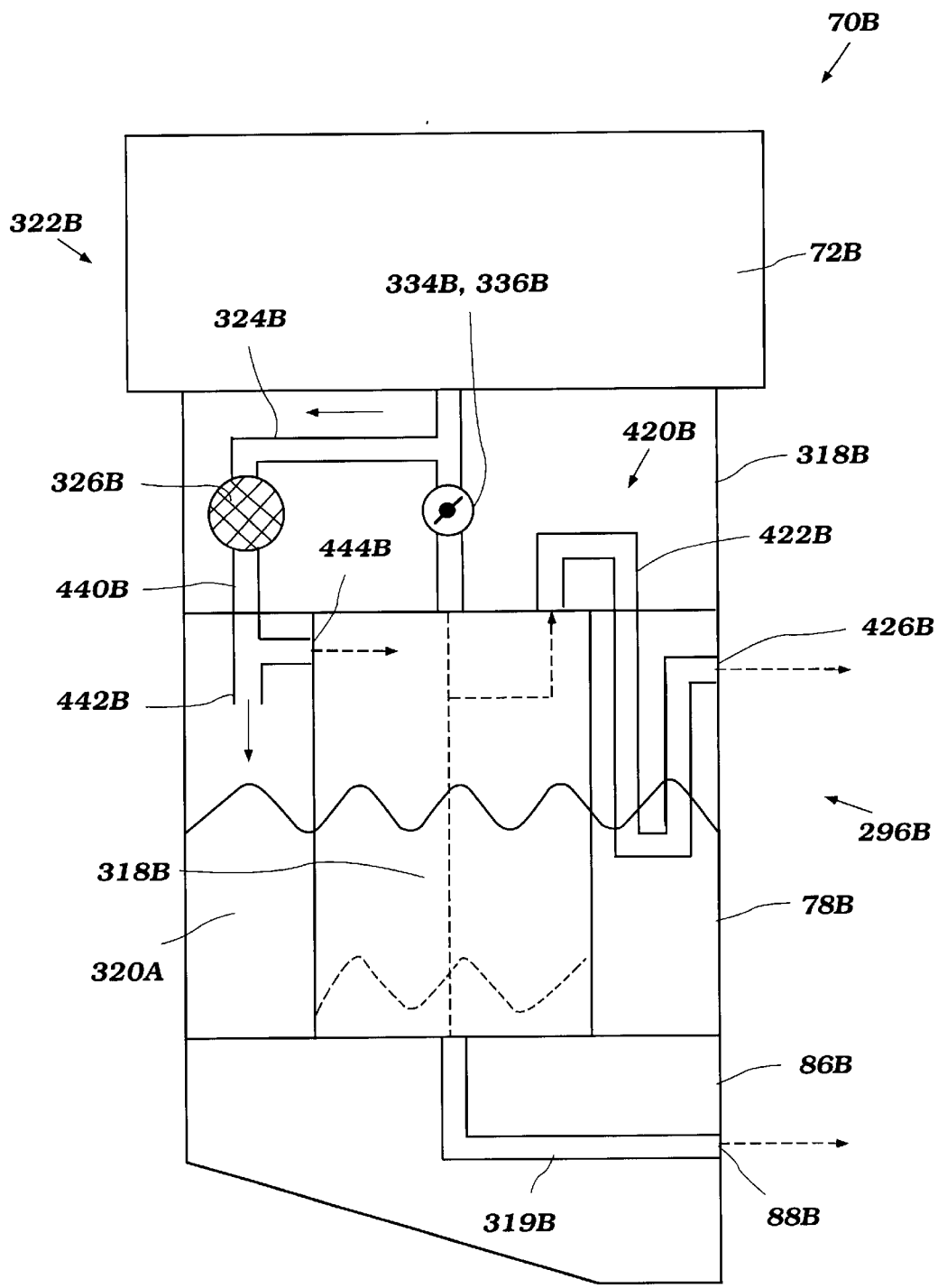
Figure 18:
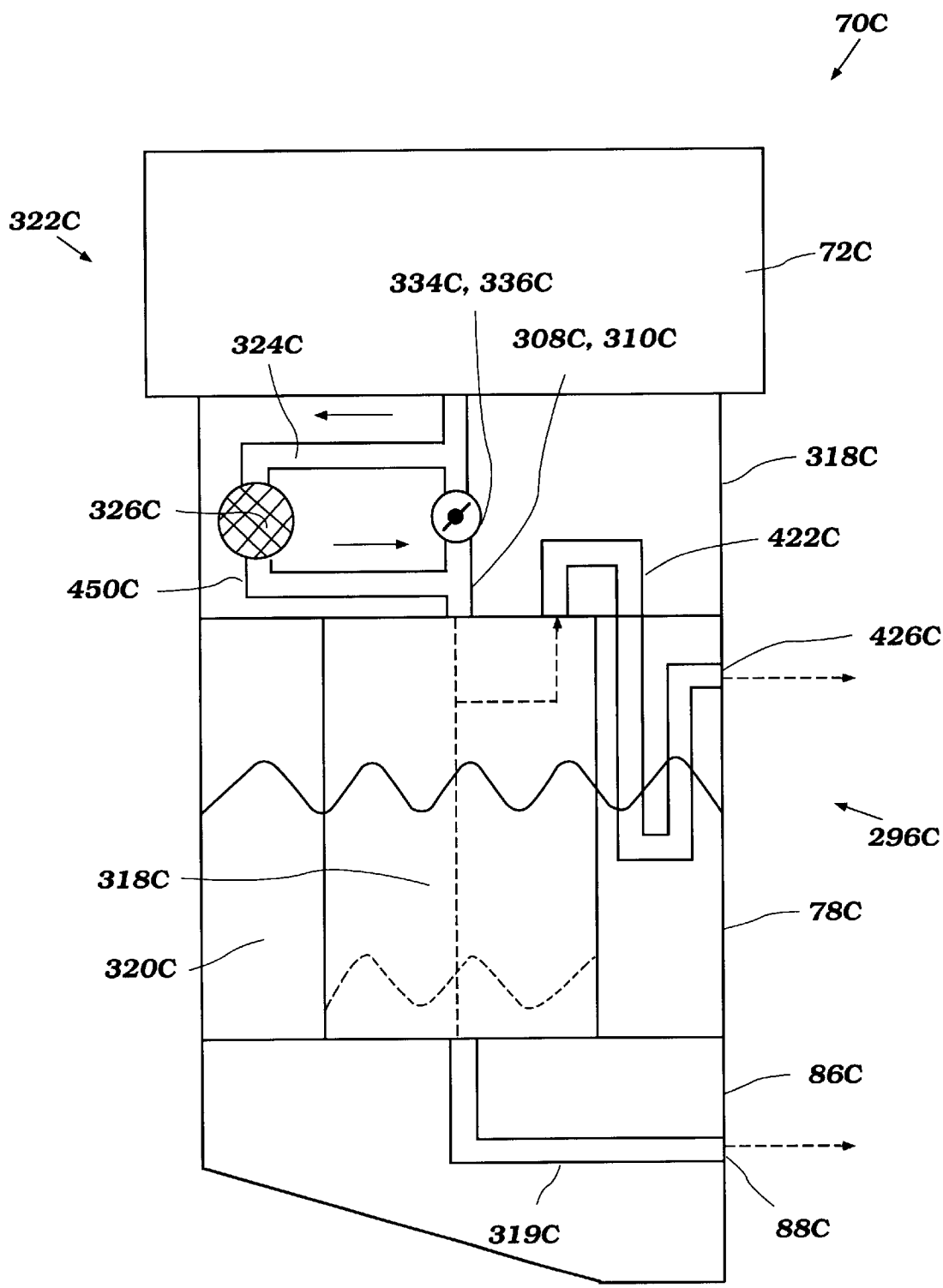
Figure 19:
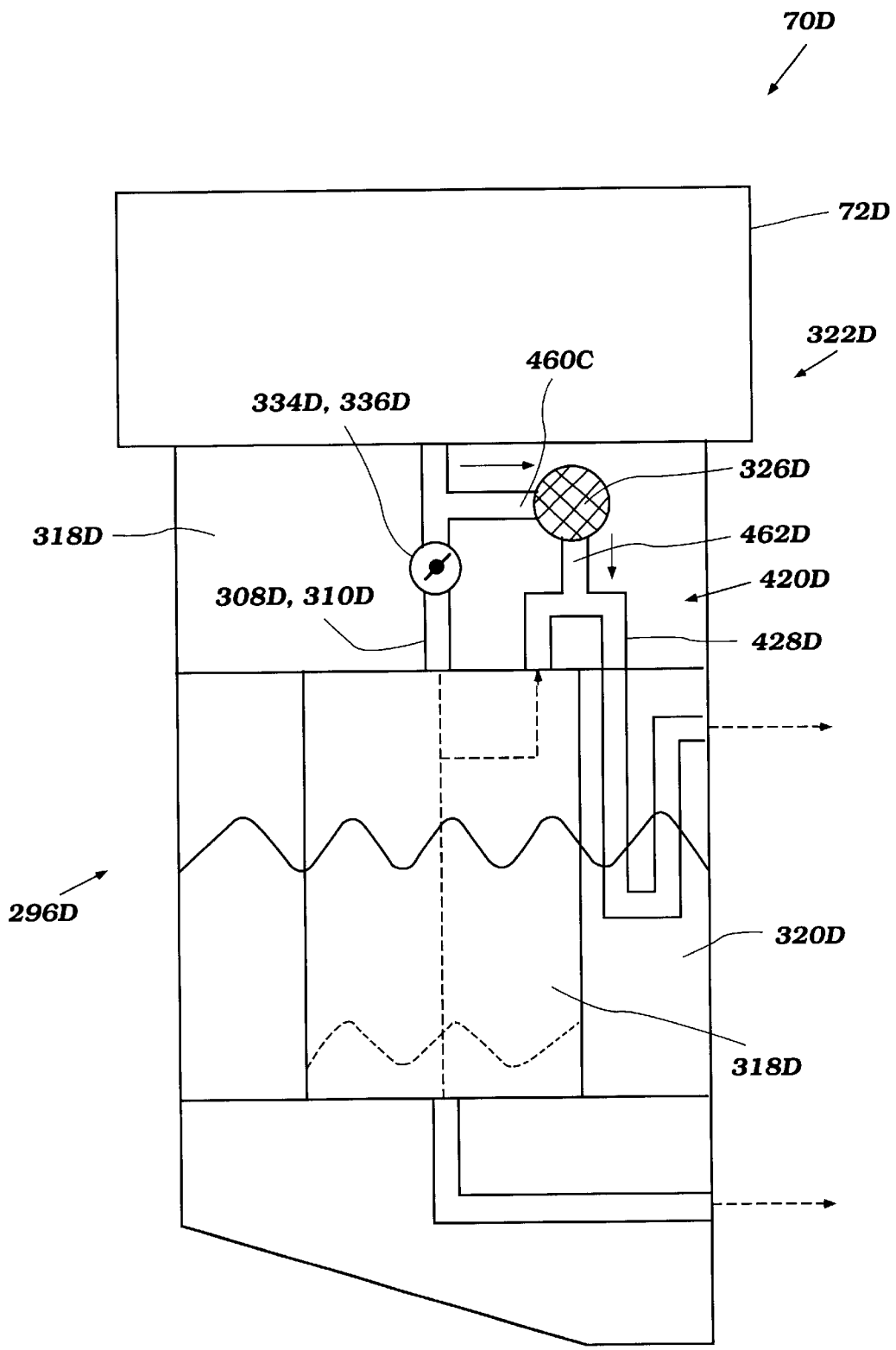
Figure 20:
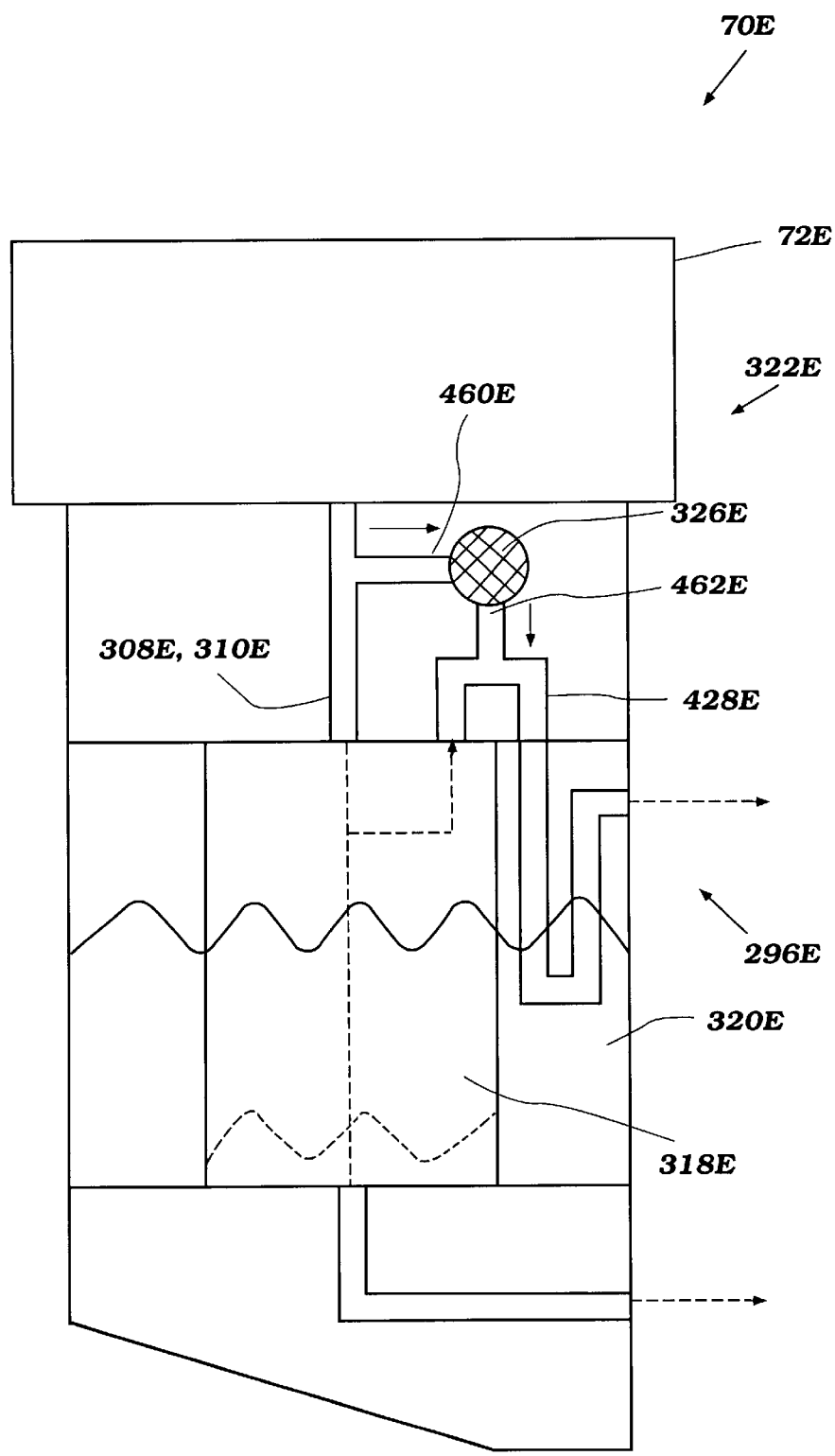
Figure 21:
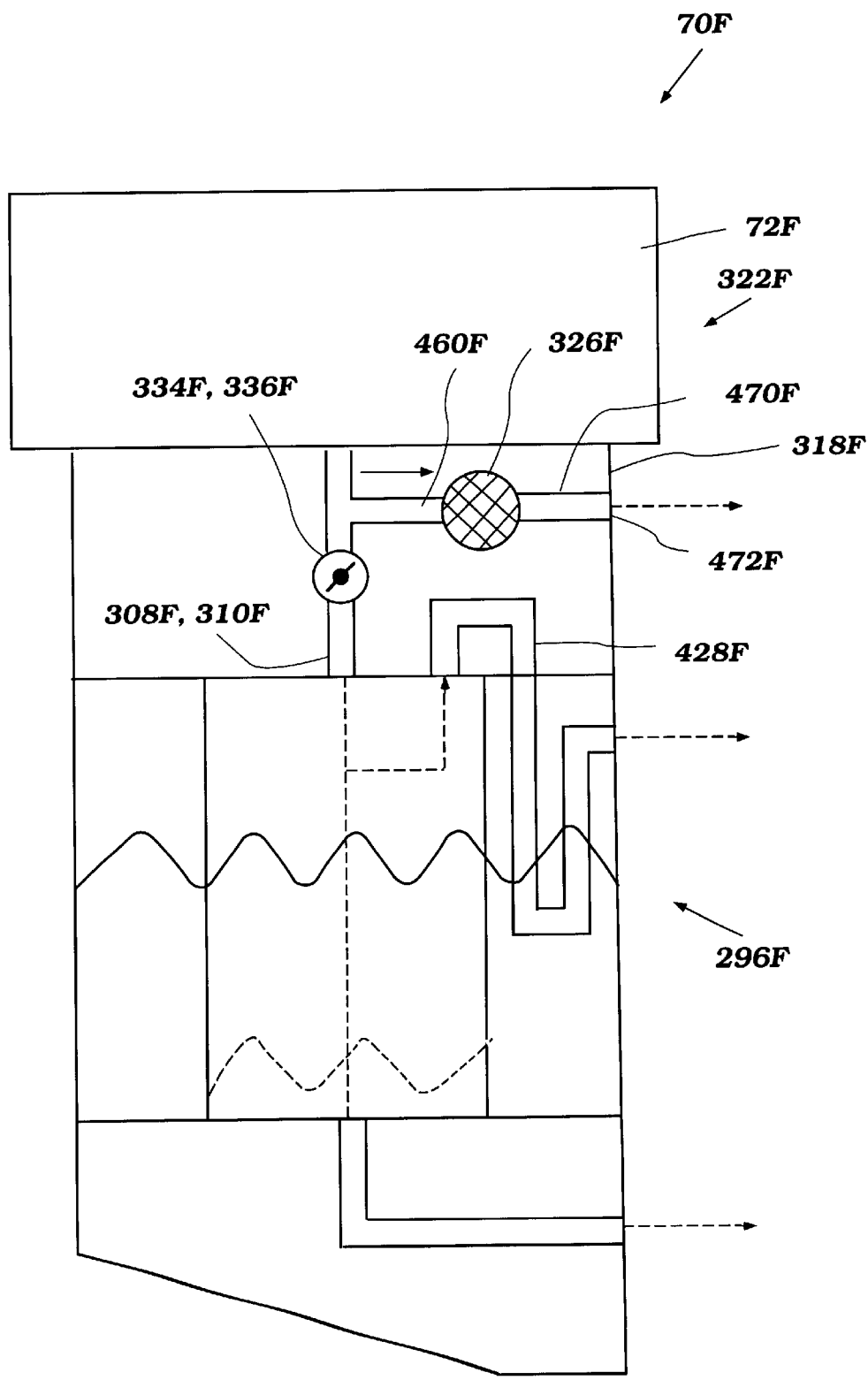
Figure 22:
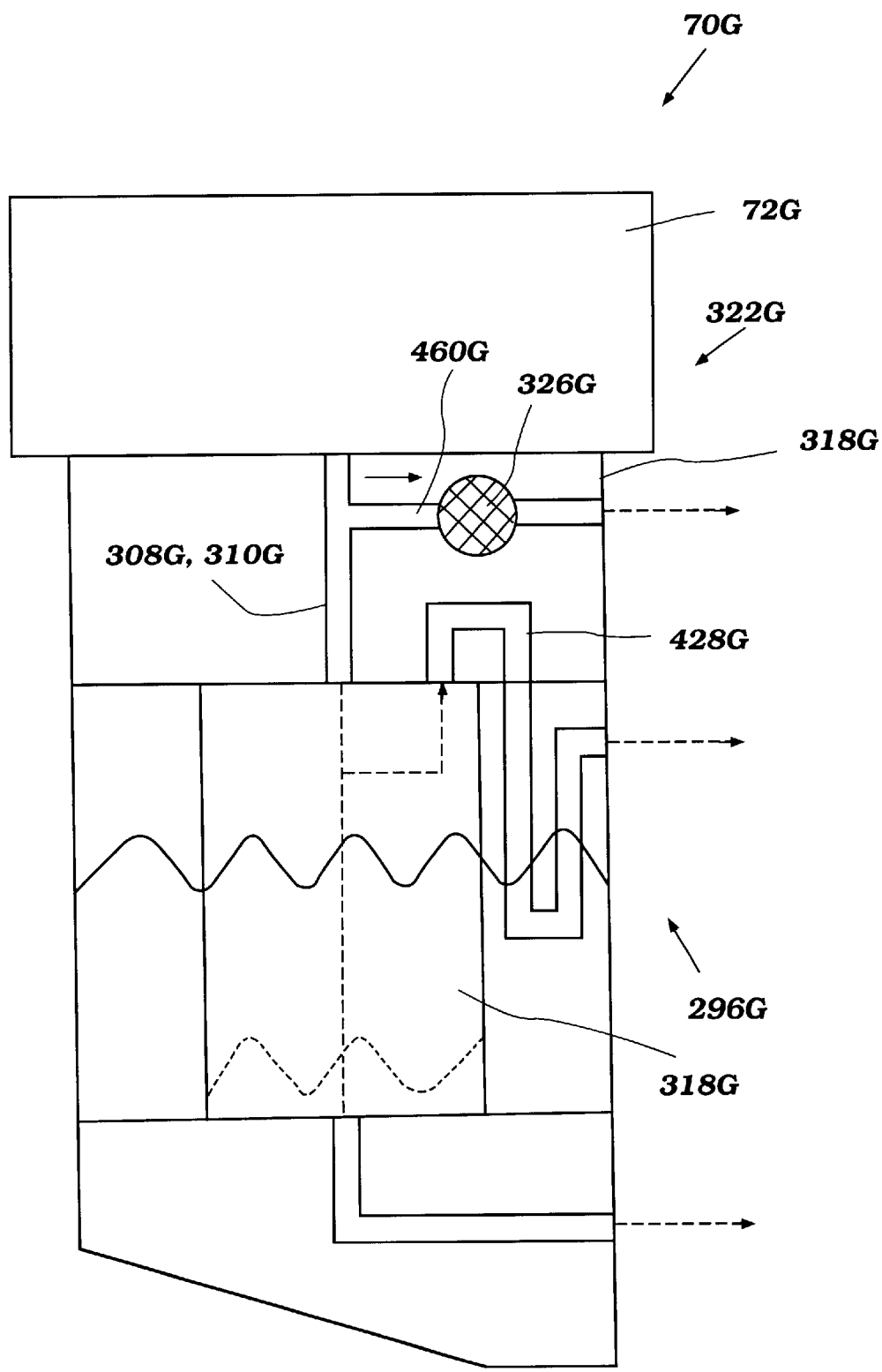
Figure 23:
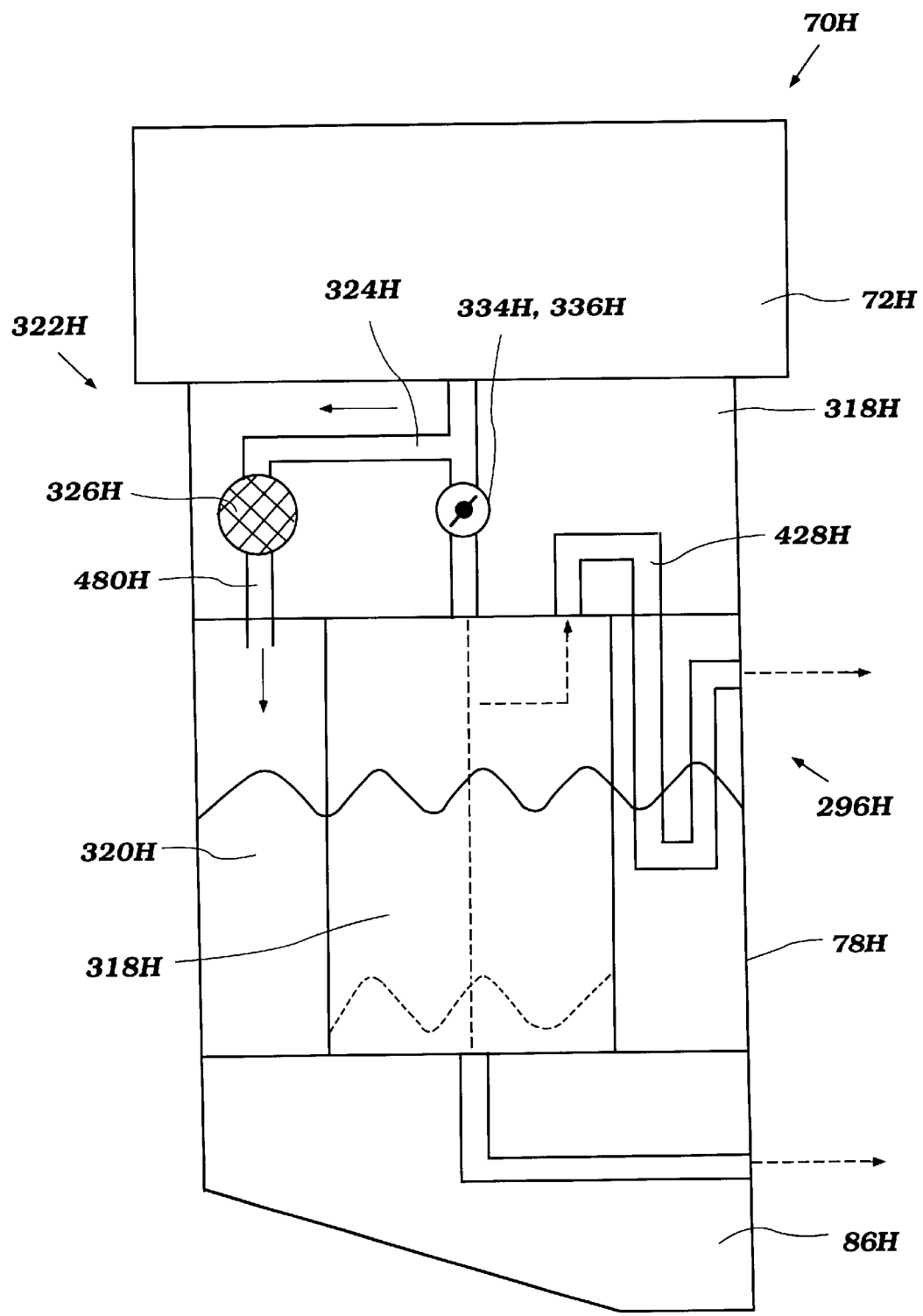
Figure 24:
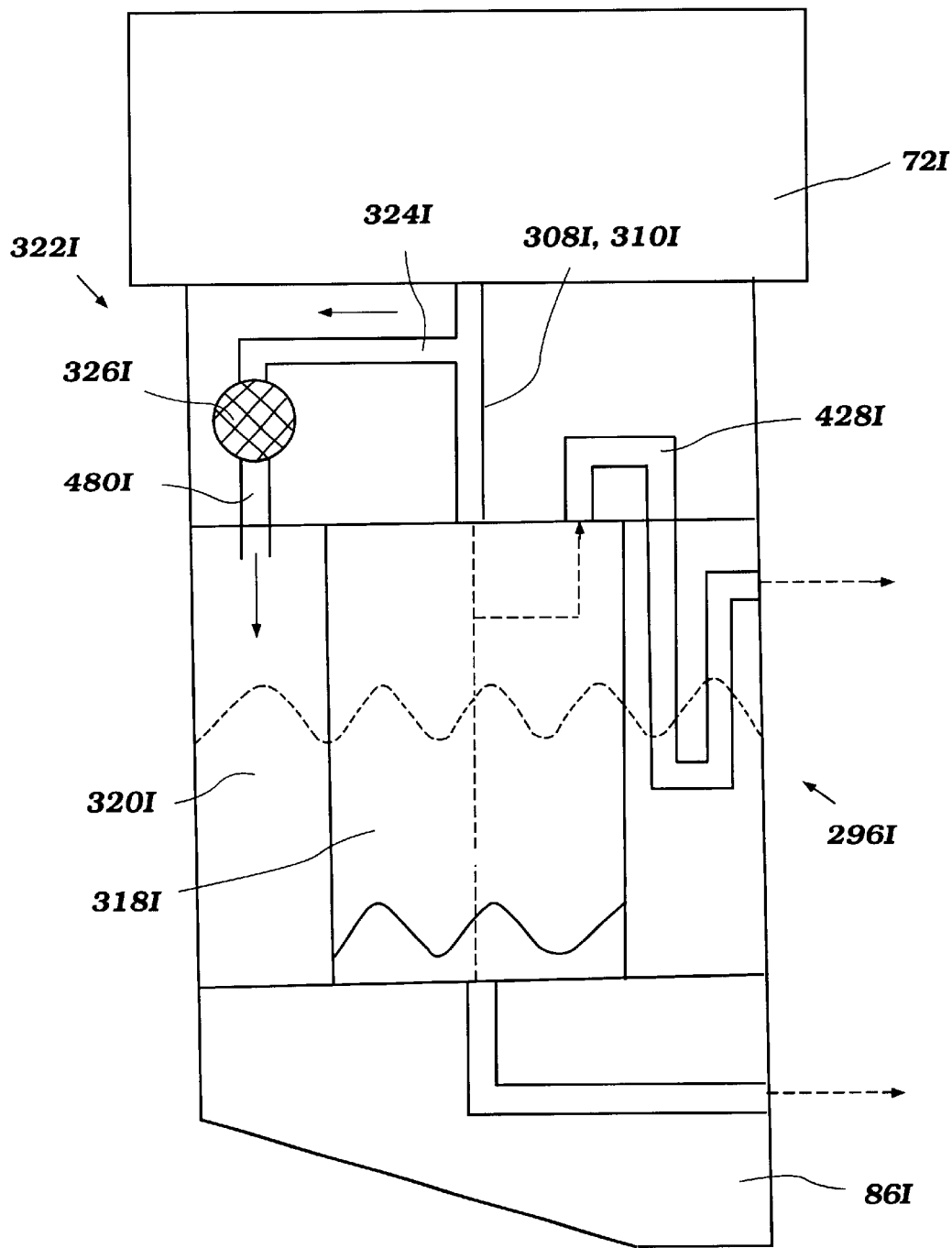

These and other features of the invention will now be described with reference to the drawings of the preferred embodiments, which are intended to illustrate and not to limit the invention, and in which:

FIG. 3 is a three-part view with the two lower portions showing the outboard motor and the upper portion showing a top plan view of the engine of the outboard motor and its fuel supply system in a schematic view, the three views are linked together by an electronic control unit (ECU) that provides engine control, as well as for the operation of exhaust valves disposed in the exhaust system, as shown in the lower left-hand view;

FIG. 4 is a top plan and partial sectional view of the outboard motor illustrated in FIG. 3;

FIG. 5 is a top plan view of an exhaust guideplate which supports the engine of the outboard motor illustrated in FIG. 3;

FIG. 6 is a bottom plan view of the exhaust guideplate illustrated in FIG. 5;

FIG. 7 is a starboard side elevational view of the exhaust guideplate illustrated in FIGS. 5 and 6 showing a catalyst device assembly with a cover and cooling jackets illustrated with cross-hatching;

FIG. 8 is a port side elevational view of the exhaust guideplate illustrated in FIGS. 5 and 6;

FIG. 9 is an enlarged side elevational view of the cover of the catalyst device assembly illustrated in FIG. 7;

FIG. 10 is a top plan view of the catalyst device included in the catalyst device assembly illustrated in FIG. 7;

FIG. 11 is a sectional view of the catalyst device illustrated in FIG. 10;

FIG. 12 is a port side elevational view of the exhaust guideplate illustrated in FIGS. 5 and 6, including a modification of the exhaust valve drive control illustrated in FIG. 3;

FIG. 13 is a graph illustrating a relationship between exhaust valve opening, plotted on the vertical axis, and throttle opening plotted on the horizontal axis;

FIG. 14 is a graph illustrating a relationship between the total amount of exhaust gases emitted, plotted on the vertical axis, and throttle opening, plotted on the horizontal axis, wherein the total is represented in a solid line extending through the data points represented as black circles, the flow of exhaust gases through a main exhaust passage illustrated as a broken line plotted through data points represented as "X"s and the flow of exhaust gases through a sub or a branched exhaust passage illustrated as a solid line without data points;

FIG. 15 is a graph illustrating a relationship between exhaust valve opening, plotted on the vertical axis, and catalyst outlet temperature, plotted on the horizontal axis;

FIG. 16 is a schematic side elevational and partial sectional view of the outboard motor illustrated in FIG. 3 including a modification of the exhaust system;

FIG. 17 illustrates a further modification of the exhaust system shown in FIG. 3;

FIG. 18 shows another modification of the exhaust system shown in FIG. 3;

FIG. 19 illustrates yet another modification of the exhaust system shown in FIG. 3;

FIG. 20 shows a farther modification of the exhaust system shown in FIG. 3;

FIG. 21 illustrates a different modification of the exhaust system shown in FIG. 3;

FIG. 22 illustrates another different modification of the exhaust system shown in FIG. 3;

FIG. 23 illustrates another modification of the exhaust system shown in FIG. 3; and FIG. 24 illustrates a further modification of the exhaust system shown in FIG. 3;

DETAILED DESCRIPTION OF THE PREFERRED EMBODIMENTS OF THE INVENTION

With reference to FIGS. 3 and 4, an overall configuration of an outboard motor 70 is described below. The outboard motor 70 employs an internal combustion engine 72 having an exhaust system 74 configured in accordance with a preferred embodiment of the present invention. The described exhaust system 74 has particular utility with outboard motors, and thus, is described in the context of the outboard motor 70. The exhaust system 74, however, can be applied to other types of watercraft and recreational vehicles as well, such as, for example, personal watercraft, small jet boats, off-road vehicles, as well as automobiles.

In the lower right hand view of FIG. 3, the outboard motor 70 is depicted in side elevational view. The entire outboard motor 70 is not depicted in that the swivel bracket and clamping bracket are not completely illustrated. These components are well known in the art and the specific method by which the outboard motor 70 is mounted to the transom of an associated watercraft is not necessary to permit those skilled in the art to understand or practice the invention.

The outboard motor 70 includes a powerhead, indicated generally by the reference numeral 76, that is positioned above a driveshaft housing 78 and which houses the internal combustion engine 72. The engine 72 is shown in more detail in the remaining two views of the figure and is described in more detail below.

The powerhead 76 is surrounded by a protective cowling that includes a main cowling member 80. The main cowling member 80 is detachably affixed to a lower tray portion 82 of the protective cowling. The lower tray portion 82 encloses an upper portion of the drive shaft housing 78.

Positioned beneath the drive shaft housing 78, a lower unit 84, which includes a lower unit housing 86, rotatably journals a propeller 88. The propeller 88 forms the propulsion device for the associated watercraft.

As is typical with outboard motor practice, the engine 72 supported in the powerhead 76 so that its crankshaft 90 (see upper left hand side view of FIG. 3) rotates about a vertically extending axis. This facilitates connection of the crankshaft 90 to a drive shaft (not shown) which depends into the drive shaft housing 78. The drive shaft drives the propeller 88 through a conventional forward, neutral, or reverse transmission (not shown) contained in the lower unit 84.

The details of the construction of the outboard motor and the components which are not illustrated may be considered to be conventional or of any known type. Those skilled in the art can readily refer to any known constructions with which to practice the invention.

With continued reference to FIG. 3, the engine 72 of the illustrated embodiment is a V6 type engine and operates on a two stroke, crankcase compression principle. Although the invention is described in conjunction with an engine having a particular cylinder number and cylinder configuration, it is readily apparent that the invention can be utilized with engines having other numbers of cylinders, other cylinder configurations (e.g., in-line and W-type) and operating under other combustion principles (rotary, diesel, and 4-stroke principles).

The engine 72 includes an engine body 92. The engine body 92 includes a cylinder body or cylinder block 94 which forms a pair of cylinder banks 96, 98. Each cylinder bank 96, 98 is formed with three vertically spaced horizontally-extending cylinder bores 100 (cylinder sections are indicated as UC, MC, and LC, referring to upper cylinder, middle cylinder, and lower cylinder, respectively).

With reference to FIG. 4, pistons 102 reciprocate in the cylinder bores 100. The pistons 102 are, in turn, connected to the upper or small ends of connecting rods 104. The big ends of the connecting rods 104 are journaled on throws of the crankshaft 90 in a manner that is well known in the art.

The crankshaft 90 is journaled in a suitable manner for rotation within a crankcase chamber 106 that is formed in part by a crankcase member 108 affixed to the cylinder block 94 in a suitable manner. As is typical with 2-cycle engines, the crankshaft 90 and the crankcase chamber 106 are formed with seals so that each section of the crankshaft 90 that is associated with one of the cylinder bores 100 will be sealed from the others. This type of construction is well known in the art.

Cylinder head assemblies, indicated generally by the reference numerals 110, 112, are affixed to the end of the cylinder banks 96, 98, respectively, opposite the crankcase chamber 106. The cylinder head assemblies 110, 112 each include a plurality of recesses 114, 116 on their inner faces. Each of these recesses 114, 116, cooperates with the cylinder bores 100 and the heads of the pistons 102 to define combustion chambers 118, 120. The cylinder head assemblies 110, 112 are preferably made of aluminum alloy diecast.

With reference to the upper portion of FIG. 3, an air induction system, indicated generally by the reference numeral 122, delivers an air charge to the sections of the crankcase chamber 106 associated with each of the cylinder bores 100. The communication is via an intake port (not shown) formed in the crankcase member 108 and registering with each of the crankcase chamber sections.

The induction system 122 includes an air silencing and inlet device, shown schematically in FIG. 3 and in partial top plan view in FIG. 4, and indicated generally by the reference numeral 124. With reference to FIG. 4, the inlet device 124 includes an inlet 126 and delivers induced air to at least one, and preferably a plurality, of throttle bodies 128. The throttle bodies 128 each include a throttle valve 130 (FIG. 3). The throttle valves 130 are supported on throttle valve shafts 132. The throttle valve shafts 132 are linked together for simultaneous opening and closing of the throttle valves 130 in a manner that is well known in the art.

The induction system 122 also includes reed-type check valves 134. These check valves 134 permit the induced air flow into the sections of the crankcase chamber 106 when the pistons 102 are moving upwardly in the respective cylinder bores 100. As the pistons 102 move downwardly, the charge is compressed in the sections of the crankcase chamber 106. At that time, the reed-type check valves 134 close to permit the charge to be compressed.

The charge which is compressed in the section of the crankcase chamber 106 is then transferred to the combustion chambers 118, 120 through a scavenging system. This scavenging system preferably is of the Schnurle-type and includes a pair of main scavenge passages (not shown) that are positioned on diametrically opposite sides of each of the combustion chambers 118, 120. These main scavenge passages terminate in main scavenge ports (not shown) so as to direct scavenge air flows into the combustion chambers 118, 120 of each cylinder bore 100. Additionally, auxiliary scavenge passages are preferably formed between the main scavenge passages and terminate in auxiliary scavenging ports which provide corresponding auxiliary scavenging air flows.

During the scavenging stroke of the engine 72, the intake charge is transferred to the combustion chambers for further compression. As the pistons 102 move upwardly from their bottom end or bottom-dead-center position, the scavenge ports are closed and the charge is further compressed.

With continued reference to FIG. 3, the outboard motor 70 also includes an ignition system, generally referred to by the reference numeral 140. The ignition system includes spark plugs 142 which are fixed to the cylinder head assemblies 110, 112 and extend into the combustion chambers 114, 116. In the illustrated embodiment, the spark plugs 142 are disposed so as to extend along an axis skewed relative to the axis of each cylinder bore 100. The spark plugs 142 are fired under the control of the electronic control unit (ECU) 144. The ECU 144 receives certain signals, as described below, for controlling the timing of firing of the spark plugs 142 in accordance with any desired control strategy.

Each spark plug 142, in turn, ignites a fuel air charge that is formed from fuel sprayed by a fuel injector 146 into the air entering the combustion chambers 114, 116, from the scavenge ports. In the illustrated embodiment, the fuel injectors 146 are solenoid type and are electrically operated under the control of the ECU 144. The fuel injectors 146 are mounted directly in the cylinder head assemblies 110, 112 in a location so as to provide optimum fuel vaporization under all running conditions.

Fuel is supplied to the fuel injectors 146 by a fuel supply system, indicated generally by the reference numeral 148. The fuel supply system includes a main fuel tank 150 that is preferably supported within a watercraft associated with the outboard motor 70. A first low-pressure pump 152 is connected to the main fuel tank by a fuel supply conduit 154. In some arrangements, a plurality of secondary low-pressure pumps (not shown) can also be used to draw fuel from the fuel tank 150. The pumps can be manually operated pumps, diaphragm-type pumps operated by variations in pressure in the crankcase chamber 106, or any other suitable type of pump. Preferably, the pump 152 provides a relative low pressure draw.

A fuel filter 156 is positioned along the fuel supply conduit 154 at an appropriate location, preferably within the main cowling 80 so that the fuel filter 156 can be easily serviced. The fuel filter 156 is configured to remove undesirable amounts of water from the fuel. Therefore, the fuel filter 156 includes a sensor 158 which provides a signal to the ECU 144 through a fuel filter communication line 160 upon detection of such water or a pre-set amount of water having been removed from the fuel.

The fuel supply conduit 154 is connected to a vapor separator 162. The vapor separator 162 can be mounted on the engine 72 in any suitable location. With reference to FIG. 4, the vapor separator 162 is mounted to the engine 72 on the port side thereof.

With reference to FIG. 3, at the end of the fuel supply line 154, within the vapor separator 162, a valve is provided (not shown) that can be operated by a float 164 so as to maintain a desired level of fuel in the vapor separator 162.

A fuel pump 166 is provided within the vapor separator 162. The fuel pump 166 can be controlled by the ECU 144 via a fuel pump control line 168, in any suitable manner. The fuel pump 166 is connected to a high-pressure pumping assembly 170 with a fuel line 172. The fuel pump 166, in some arrangements, can be driven by an electric motor and preferably develops a pressure of about 3–10 kg/cm$^2$. A pressure regulator 174 can be connected between the fuel line 172 and the vapor separator 162 so as to provide a pressure-limiting return by returning some of the fuel pumped into the fuel line 172 by the pump 166 back to the vapor separator 162.

The illustrated high-pressure fuel pumping assembly 170 includes two high-pressure fuel pumps 176, 178 which are preferably configured to develop a pressure of about 50–100 kg/cm$^2$ or more. A pump drive unit 180 is provided for driving the high-pressure fuel pumps 176, 178. Preferably, the pump drive unit 180 is partly affixed to the cylinder block 94 so as to overhang between the cylinder banks 196, 198. A pulley (not shown) is affixed to a pump drive shaft of the pump drive unit 180. The pulley can be driven by means of a drivebelt (not shown) that is wrapped about a driving pulley affixed to the crankshaft 90. A tensioner preferably is provided for maintaining tension to such a drivebelt. The pump driveshaft preferably is provided with a cam disk (not shown) for operating at least one plunger 182 for each of the high-pressure fuel pumps 176, 178. Of course, any other suitable driving arrangement can also be used.

The high-pressure fuel pumps 176, 178 are connected to fuel rails 184, 186, respectively, which extend in a vertical direction, as illustrated in the lower portion of FIG. 3. The fuel rails 184, 186 are connected to the fuel injectors 146 connected to each of the cylinder head assemblies 110, 112.

Preferably, high-pressure adjusting valves 188, 190 are located between the high-pressure fuel pumps 176, 178 and the fuel rails 184, 186, respectively. High-pressure adjusting hoses connect the valves 188, 190 with the fuel rails 188, 186, respectively. The high-pressure adjustment valves are also connected to the vapor separator 162 via pressure relief lines 196, 198. Preferably, a heat exchanger (not shown) is provided along the relief lines 196, 198. At least one fuel pressure sensor 200 is connected to at least one of the high-pressure adjusting hoses 192, 194 so as to detect a pressure therein. The fuel pressure sensor 200 is connected to the ECU 144 with a fuel pressure communication line 202. As such, the high-pressure fuel pump arrangement assembly 170 maintains a substantially uniform fuel pressure therein, and the ECU 144 can monitor the fuel pressure therein through the fuel pressure sensor 200. Additionally, an arrangement of recirculating fuel lines and checkvalves is also preferably provided to allow fuel to be returned to the vapor separator 162. Preferably, a connection pip 193 connects the fuel lines 192, 194.

The outboard motor 10 also includes a lubrication system, referred to generally by the reference numeral 204. The lubrication system 204 includes a main lubricant tank 206 which is preferably supported within the watercraft associated with the outboard motor 70. The lubrication system 204 also includes a first lubricant pump 208, a second lubricant tank 210, and a lubricant injection pump 212. The lubricant pump 208 draws lubricant from the main lubricant tank 206 and delivers it to the second lubricant tank 210, which is preferably mounted within the cowling 80. The ECU 144 is connected to the pump 208 via a lubricant pump communication line 214. As such, the ECU can control the pump 208 so as to maintain a desired amount of lubricant within the lubricant tank 210. The lubricant tank 210 is connected to the lubricant pump 212 via a lubricant line 216.

The lubricant pump 212 is connected to the ECU 144 via a second lubricant pump communication line 218. The lubricant pump 212 includes an outlet disposed within the inlet device 124 so as to spray lubricant into the induced air traveling into the crankcase chamber 106. The ECU 144 controls the amount of oil sprayed into the inlet 124 by controlling the lubricant pump 212 via the communication line 218.

Preferably, the lubrication system 204 also includes a fuel pump 220 which draws fuel from the vapor separator 162 through a fuel line 222 and checkvalve 224. The fuel pump 220 delivers fuel to the lubricant supply line 216 through the lubricant line 222 so as to pre-mix some fuel with the lubricant sprayed into the inlet 124. Also preferably, a lubricant filter 226 is provided in the lubricant line 222 so as to remove foreign particles that may be entrained in the fuel flowing through the fuel line 222.

The ECU 144 communications with the fuel pump 222 via a fuel pump communication line 228. As such, the ECU 144 can control an amount of fuel drawn from the vapor separator by the fuel pump 220 to thereby control the relative proportions of fuel and oil injected into the inlet device 124. The lubrication system 204 also preferably includes a lubricant level sensor 230 (lower right-hand portion of FIG. 3) which is connected to the ECU 144 via a lubricant level sensor communication line 232. As such, the ECU 144 can receive a signal from the lubricant level sensor 230 and control the lubricant pump 208 in accordance with the signal from the sensor 230 so as to maintain a desired level of lubricant within the lubricant tank 210.

The operation of the fuel injectors 146 and the spark plugs 142 preferably is controlled via a feedback control system, referred by generally by the reference numeral 234. The feedback control system 234 comprises the ECU 144 and a number of sensors configured to output a signal indicative of various conditions including, for example but without limitation, engine running conditions, ambient conditions, or conditions of the outboard motor 70 that affect engine performance.

Certain sensors are schematically represented in FIG. 3. For example, an engine speed sensor 236 is mounted in the vicinity of the crankshaft 90 and/or flywheel attached to the crankshaft 90. The engine speed sensor 236 outputs a signal indicative of the speed of rotation of the crankshaft 90. The signal from the engine speed sensor 236 is transferred to the ECU 144 via a crankshaft speed data line 238.

Preferably, in addition to the engine speed sensor 236, the engine 72 includes a crankshaft position sensor 240 mounted in the vicinity of the flywheel 242 attached to the crankshaft 90. The output signal from the crankshaft position sensor 240 is transferred to the ECU 144 via a crankshaft position data line 244. As such, the ECU 144 can receive the output signal from the crankshaft position sensor for use in determining proper fuel injection and spark plug timing, for example.

A throttle position sensor 246 can be mounted in the vicinity of the throttle valve 130. The throttle valve position sensor 246 outputs a signal indicative of the throttle position of the throttle valve 130 so as to detect the position of the throttle valve 130. The signal from the throttle valve position sensor 246 is transferred to the ECU 144 via a throttle position data line 248. As such, the output of the throttle position sensor 246 can be used by the ECU 144 as an indication of operator demand or engine load.

For example, when an operator of the outboard motor desires to accelerate an associated watercraft, the operator advances a throttle actuator (not shown) and further opens the throttle valve 130, thus increasing the load on the engine.

A coolant temperature sensor 250 (see lower right-hand portion of FIG. 3) can be connected to a cooling jacket (not shown) provided on the engine 72 so as to detect the temperature of coolant flowing in the cooling jacket. The coolant temperature sensor 250 is connected to the ECU 144 via a coolant temperature data line 252. As such, the ECU can receive a signal from the cooling temperature sensor 250 indicative of the temperature of coolant flowing through the cooling jacket provided in the engine 72.

An engine temperature sensor 254 (see upper left-hand side of FIG. 3) can be connected to the engine body 92, and preferably, one of the cylinder banks 96, 98, so as to sense a temperature of the engine body 92. The engine temperature sensor 254 is connected to the ECU 144 via an engine temperature data line 256. As such, the ECU 144 can receive a signal from the engine temperature sensor 254 indicative of the temperature of the engine body 92.

A trim angle sensor 258 (see lower right-hand portion of FIG. 3) can be connected to the outboard motor 70 so as to sense a trim angle of the outboard motor 70. The trim angle sensor 258 is connected to the ECU 144 via a trim angle data line 260. As such, the ECU 144 can receive a signal from the trim angle sensor 258 that is indicative of a trim angle of the outboard motor 70.

The outboard motor 70 can also include a knock sensor, which may be in the form of a vibration sensor, connected to the engine body 92. The knock sensor 262 is configured to emit a signal indicative of whether combustion within the combustion chambers 118, 120 is producing knocks. The knock sensor 262 is connected to the ECU 144 by a knock sensor data line 264. As such, the ECU 144 can receive a signal from the knock sensor 262.

With reference to the upper left-hand portion of FIG. 3, the engine 72 can include an air pressure sensor 266. The air pressure sensor 266 is connected to the air intake device 124 so as to detect a pressure within the intake air device 124. The air pressure sensor 266 is connected to the ECU 144 with an air pressure sensor data line 268. As such, the ECU 144 can receive a signal from the air pressure sensor 266 which is indicative of an air pressure within the air intake device 124.

With reference to the lower left-hand portion of FIG. 3, the engine 72 can also include an air/fuel ratio sensor 270. Preferably, the air/fuel ratio sensor 270 is in the form of an oxygen sensor configured to detect an amount of oxygen present in the exhaust gases from one of the combustion chambers 118, 120, which is indicative of the air/fuel ratio of the air/fuel charge prior to combustion. The air/fuel ratio sensor 270 is connected to the ECU 144 via a air/fuel ratio data line 272. As such, the ECU 144 can receive a signal from the air/fuel ratio sensor 270.

The engine 72 can also include an exhaust back-pressure sensor 274. The back-pressure sensor 274 is configured to sense a back-pressure within an exhaust passage of the engine body. The back-pressure sensor 274 is connected to the ECU 144 via a back-pressure sensor data line 276. As such, the ECU 144 can receive a signal from the back-pressure sensor 274 which is indicative of the back-pressure within the exhaust passage.

In addition to the sensors described above, additional sensors may be provided for detecting other conditions for use in accordance with various control strategies.

The ECU 144, as noted above, outputs signals to the fuel injectors 146, the spark plugs 142, and the fuel pump 166 for their respective control. In the illustrated embodiment, the ECU 144 outputs a signal to the spark plugs via a spark plug control line 280. The ECU 144 also outputs a signal to the fuel injectors 146 via a fuel injector control line 282. The ECU 144 outputs a signal to the fuel pump 166 via the fuel pump control line 168. Additionally, the ECU 144 controls the lubricant injection pump 212, the lubricant pump 208, and the fuel pump 220 via the control lines 218, 214, and 228, respectively. Additionally, the ECU 144 can be connected to various other components of the engine 72 to control these components according to any known control strategy.

The outboard motor 10 also includes a cooling system, referred to generally by the reference numeral 290 (lower right-hand portion of FIG. 3). The cooling system includes a coolant pump 292 which can be driven by the driveshaft. The coolant pump 292 includes an inlet 294 disposed on the lower unit housing 86 so as to communicate with the body of water in which the outboard motor 70 is operating. The cooling system 290 also includes a plurality of cooling jackets throughout the outboard motor 70 for cooling components therein which are subjected to or generate heat. For example, the engine body 92 includes a number of cooling jackets around the cylinder walls, the combustion chambers, as well as various components of the exhaust system described in more detail below. The coolant pump 292 is configured to draw cooling water in through the inlet 294 and direct the cooling water through the various cooling jackets of the engine and the other components. As shown in the lower right-hand portion of FIG. 3, after the coolant flows upwardly into the engine 72, it then flows downwardly and is discharged through the propeller 88, along with exhaust gases. Certain components of the cooling system 290 are described in more detail below.

With reference to the lower left-hand portion of FIG. 3, the engine 72 includes an exhaust system, indicated generally by the reference numeral 296. With reference to FIG. 4, exhaust ports 298, 300 are formed on a side of the cylinder bores 200. In the illustrated embodiment, the exhaust ports 298, 300 are formed on the side of the cylinder banks 96, 98 which face toward the valley defined therebetween. An exhaust manifold 302 includes a plurality of exhaust runners 304, 306 having inlet ends which communicate with the exhaust ports 298, 300, respectively. The exhaust runners 304, 306 merge within a merging portion of the exhaust manifold 302 into main exhaust passages 308, 310. Although only one exhaust runner 304, 306 is illustrated for each cylinder bank 96, 98 in FIG. 4, there is at least one exhaust runner 304, 306 for each cylinder 100 defined in the engine body 92.

As is common in outboard motor practice, the exhaust manifold 302, including the portion where the exhaust runners 304, 306 merge together into the main exhaust passages 308, 310, it is monolithically cast with the cylinder banks 96, 98. However, it is conceived that the exhaust manifold 302 could also be formed separately and connected to the exhaust ports 298, 300 in any appropriate manner.

With reference to the lower left-hand portion of FIG. 3, the exhaust manifold 302 is shaped such that the merging portion of the exhaust manifold 302 extends downwardly and connects to an exhaust guideplate 312. The exhaust guideplate 312, described in more detail below, supports the engine 72 and includes apertures 362, 364 which define a portion of the main exhaust passages 308, 310, respectively. Additionally, exhaust pipes 314, 316 depend from the exhaust guideplate 312 and extend downwardly into an expansion chamber 318. The exhaust pipes 314 and 316 each include outlet ends terminating in the expansion chamber 318 such that the main exhaust passages 308, 310 communicate with the expansion chamber 318.

The expansion chamber 318 is disposed within the upper housing 78 and is arranged such that at least a portion of the expansion chamber 318 lies below a water line WL when the outboard motor 70 is mounted to a watercraft which is at rest. Additionally, a volume of space between the expansion chamber 318 and the casing 78 defines a water wall 320.

The expansion chamber 318 includes an outlet end at a lower portion thereof which communicates with a discharge path defined in the lower casing 86. In operation, exhaust gases from the combustion chambers 114, 116 are guided through the exhaust ports 298, 300, through the main exhaust passages 308, 310 and the into expansion chamber 318. The expansion chamber 318 quiets noises traveling with the exhaust gases and is preferably tuned to generate desirable reflection waves to the exhaust ports 298, 300, as known in the art. Exhaust gases leave the expansion chamber 318 and are discharged outwardly through the propeller 88.

With the continued reference to the lower left-hand portion of FIG. 3, the outboard motor 70 also includes an exhaust catalyst arrangement, indicted generally by the reference numeral 322. The exhaust catalyst arrangement 322 includes a branched exhaust passage 324 having an inlet end connected to the main exhaust passage 310 and an outlet end connected to a catalyst device 326. Preferably, a further exhaust passage extends between the main passages 308, 310 such that both of the main exhaust passages 308, 310 can communicate with the inlet of the branched exhaust passage 324.

The catalyst device 326 can have a composition which helps to catalyze unburned hydrocarbons present in the exhaust gasses discharged from the combustion chambers 118, 120, as known in the art. The catalyst arrangement 322 also includes a discharge passage 328 with an inlet end communicating with the catalyst device 326 and an outlet end 329. In the illustrated embodiment, the outlet end 329 of the exhaust passage 328 communicates with the expansion chamber 318, described in more detail below.

The catalyst arrangement 322 also includes a catalyst temperature sensor 330 which is configured to sense a temperature of the catalyst device 326. The temperature sensor 330 is connected to the ECU 144 via temperature sensor data line 332. As such, the ECU 144 can receive a signal from the sensor 330 which is indicative of the temperature of the catalyst device 326.

The catalyst arrangement 322 can be configured such that when the engine 72 is idling, and thus the watercraft associated with the outboard motor 70, is approximately at rest or moving slowly, substantially all of the exhaust gases traveling through the main exhaust gases traveling through the main exhaust passages 308, 310 are diverted into the branched passage 324 and through the catalyst device 326. For example, as shown in the lower left-hand portion of FIG. 3, the lower ends of the exhaust pipes 314, 316 are approximately at the water line WL. Thus, when the watercraft and outboard motor 70 are at rest, water from body of water in which the outboard motor 70 is operating, fills the expansion chamber 318 up to the water line WL. The water thus causes some back pressure within the main passages 308, 310. This back pressure helps to urge the exhaust gases to be diverted from the main exhaust passages 308, 310 and in to the branch exhaust passage 324. Thus, the exhaust gases flowing therethrough travel into the catalyst devise 326 and through the discharge passage 328 into the expansion chamber 318.

Thus, when the outboard motor 70 is idling, substantially all of the exhaust gases generated in the combustion chamber 118, 120, are directed through the catalyst device 326 wherein unburned hydrocarbons are catalyzed and thus removed from the exhaust gases. By removing the unburned hydrocarbons, the generation of smoke from the outboard motor is dramatically reduced. Thus, when passengers within a watercraft associated with the outboard motor 70 are seated within the watercraft when the outboard motor 70 is only idling or moving the watercraft at low speed, the passengers are not subjected to smoke which is normally generated by outboard motors without catalyst devices.

On the other hand, when the outboard motor 70 is running at higher speed, the water line WL moves downwardly to a position just above the propeller 88, particularly when the associated watercraft is planing. Additionally, the flow of exhaust gases through the main exhaust passages 308, 310, is sufficient to push much of the water out of the expansion chamber 318 and the lower case 86 until the expansion chamber 318 and lower case 86 are nearly devoid of water. Thus, substantially all of the exhaust gases leaving the expansion chambers 118, 120, flow through the outlet ends of the exhaust pipes 314, 316. As such, the catalyst device 326 does not greatly contribute to back pressure within the exhaust system 296 during higher speed operation.

Additionally, because all of the exhaust gases at higher engine speeds do not pass through the catalyst device 326, the catalyst device 326 does not need to be as large as a catalyst device which is used to treat all of the exhaust gases flowing out of an engine. Thus, by constructing the exhaust catalyst arrangement 322 as such, a smaller catalyst device can be used while maintaining the smoke removing function during idling, when passengers of an associated watercraft are most likely to be subjected to such smoke.

With reference to the lower left-hand portion of FIG. 3, the exhaust system 296 can also include exhaust valves 334, 336 disposed in the main exhaust passages 308, 310, respectively, and downstream from the merging portion of the exhaust manifold 302. The valves 334, 336, are mounted on an exhaust valve shaft 338. The shaft 338 is journaled for rotation within the exhaust guideplate 312, described in more detail below. The valves 334, 336 are flap-type valves, however, any other type of valve could also be used, such as, for example, but without limitation, butterfly valves.

The shaft 338 is also connected to a motor 340 which is configured to move the valves 334, 336 at least between an open position, in which the main exhaust passages 308, 310 are opened and a closed position, in which the main exhaust passages 308, 310 are closed. The motor 340 is connected to the ECU 144 via an exhaust valve drive motor control line 342. Thus, the ECU 144 can control the orientation of the valves 334, 336 as desired.

With reference to FIGS. 5 and 6, and as noted above, the exhaust guideplate 318 supports the engine 72. The exhaust guideplate 318 thus includes engine mounts 344 which support the engine 72 in a known manner.

With reference to FIG. 6, which shows a bottom plan view of the exhaust guideplate 318, cooling passages are defined within the guideplate 318. For example, the exhaust guideplate 318 includes a coolant supply aperture 346. The coolant supply aperture 346 is supplied with water from the water pump 292 and directs the cooling water to various other water holes 348, 350. As the water flows through the guideplate 318 it helps cool the components which are heated by exhaust gases flowing therethrough. The water then is supplied upwardly to the engine body 72 through the supply apertures 348, 350. After the water flows through the engine body 92, and thereby cools the engine 72, the cooling water is returned to the exhaust guideplate through return apertures 352 and 354. The return aperture 352 is oriented so as to direct cooling water into the expansion chamber 318. Thus, the cooling water is used to further cool the exhaust gases which has other desirable effects for the tuning the expansion chamber 318. The return aperture 354 directs cooling water into the water wall 320 which is used to further cool the expansion chamber 318.

With reference FIG. 6, preferably, a pate 356 (illustrated with cross-hatching for clarity) covers the return apertures 352. Additional holes (not shown) communicate with flanges which mount the exhaust pipes 314, 316 to the portions of the exhaust guideplate 318 which define part of the main exhaust passages 308, 310, respectively. As such, cooling water returning from the engine 72 is injected into the exhaust pipes 314, 316 and thus mixes with exhaust gases entering the expansion chamber 318.

Preferably, the exhaust guideplate 318 is also provided with an aperture 357 which is sized to receive an exhaust valve assembly 358. The exhaust valve assembly 358 includes a flange 360 which is connected to the guide plate 318 with bolts 359. The exhaust valve assembly 358 also includes a valve body 361 which is supported by the flange and journals the exhaust valve shaft 338 and thereby supports the valves 334, 336.

The valves 334, 336 preferably are cooled by cooling water flowing through the cooling system 290. With reference to FIG. 5, the exhaust guide plate 318 includes a water inlet 363 which allows water to flow into thermal communication with the valves 334, 336. Additionally, the guide plate 318 includes a return port 365 (FIG. 6) which allows the cooling water to return to another passage of water flowing through the guide plate 318. Preferably, the inlet 363 and the return port 365 connect with a cooling water inlet and outlet (not shown) disposed on the flange 360.

With reference to FIG. 5, the exhaust guideplate 318 also includes a main exhaust connection passage 366 which connects the apertures 362, 364 with each other. In the illustrated embodiment, the main exhaust connection passage 366 is approximately aligned with the branched exhaust passage 324, however, the connecting passage 366 could be disposed anywhere between the apertures 362, 364.

As shown in FIG. 5, the catalyst assembly 322 includes the base portion 368 and a cover portion 370 (also shown in FIG. 10). A flange portion 372 connects the base portion 368 with the cover portion 370. The catalyst device 326 is disposed between the base portion 368 and the cover portion 370.

Preferably, the base portion 368 is formed monolithically with the exhaust guideplate 318. However, it is conceived that the base member 368 could also be formed separately and secured to the exhaust guideplate 318 in any known manner. The cover 370 is secured to the base portion 368 preferably with a plurality of bolts. With reference to FIGS. 5, 10, and 11, the catalyst device 326 is cylindrical in shape with a longitudinal axis 369 extending generally parallel to the flange 372.

With reference to FIG. 5, the branched exhaust passage 324 extends into an interior of the catalyst assembly 322. With reference to FIG. 6, the return passage 328 also extends to an interior of the catalyst assembly 322. Thus, in operation, exhaust gases flowing through the main exhaust passages 308, 310, under the circumstances noted above, are diverted into the connection passage 366 and the branched passage 324 so as to direct exhaust gases into the catalyst assembly 322. The exhaust gases flow through the catalytic device 326 wherein unburned hydrocarbons are catalyzed. The exhaust gases then return into the exhaust guideplate 318 through the return passage 328 and then to the expansion chamber 318.

Preferably, the catalyst assembly 322 also includes a cooling jacket member 374 mounted to the cover 370, so as to define a cooling jacket 376 therebetween. Preferably the cooling jacket 376 is provided with cooling water from the coolant inlet port 346, and coolant passages formed in the base portion 368 so as to cool the catalyst device 326. Preferably, the catalyst assembly 322 also includes a sacrificial anode 378 extending into the cooling jacket 376 so as to prevent corrosion of the catalyst device 326.

Also preferably, in order to provide a visual reference to ensure proper cooling of the catalyst device 326, the catalyst device assembly 322 includes a telltale port 380. As show in FIG. 7, the telltale port 380 is directed rearwardly from the cooling jacket 376 and is configured to bleed cooling water from the cooling jacket 376 so that a user can visually verify that cooling water is flowing through the cooling jacket 376. Additionally, the cover 370 preferably includes ribs 382 for providing additional strengthening of the cover 370.

Although not illustrated in FIG. 5 the motor 340 can be connected to the shaft 338 in any known manner so as to provide control over the movement of the valves 334, 336. Preferably, the motor 340 is of the type which can provide proportional control over the actuation of the valves 334, 336, under the control of the ECU 144.

With reference FIGS. 5, 6, 8 and 12, in addition or in lieu of the motor 340, the valve drive assembly 360 can include a linking mechanism 384 which is configured to operate the valves 334, 336 based on another user changeable input parameter.

As shown in FIG. 12, the assembly 384 includes a pivot arm 382 attached to the throttle valve shaft 132 so as to pivot therewith. The link assembly 384 also includes a link rod 386 which is connected to an exhaust valve control lever 388. The exhaust valve control lever 388 is attached to the exhaust valve shaft 338 at its inner end so as to pivot therewith. Additionally, at its outer end, the exhaust valve control lever 388 includes a connection portion 390 defining a slot 392. The rod 386 includes a pin 394 attached thereto. The pin 394 extends into the slot 392. The slot 392 and the pin 394 are configured such that the pin 394 can move at least a predetermined distance relative to the lever 388 without causing the lever 388 to move.

Preferably, the exhaust valve control lever 388 is biased towards a position, indicated y the letter "A" in which the valves 334, 336 substantially close the main exhaust passages 308, 310. In the position A, the throttle valve shaft 132 is in an idling position. When the throttle valve shaft is moved to a fully open position, the throttle valve lever 382 is moved to the position indicated by 382'.

When the throttle valve lever 382 is moved to the position 382', the rod 386 is thereby moved to the position indicated by the numeral 386'. When the rod 386 begins to move, the pin 394 slides within the slot 392 until it reaches the end thereof. Then the lever 388 is moved in the direction, indicated by arrow B, until the lever reaches the position indicated by the letter "C", wherein the connection portion 390 is identified by the reference numeral 390'. In the position C, the exhaust valves 334, 336 and the throttle valves 130 are fully opened, thereby allowing substantially all of the exhaust gases to flow through the main exhaust passages 308, 310.

FIG. 13 includes a graph illustrating a relationship, plotted as line 400, between the degree of opening of the exhaust valves 334, 336, plotted on the vertical axis, and the degree of opening of the throttle valves 130, plotted on the horizontal axis. As shown in the lower left-hand portion of the graph in FIG. 13, there is predetermined range of throttle openings over which the exhaust valve does not open. Preferably, this range indicated as range 402 includes at least 0 RPM up to at least the approximate idle speed of the engine 72. Thus, when the engine 72 is idling, the exhaust valves 334, 336 are closed and thus substantially all of the exhaust gases flowing into the exhaust manifold 302 are diverted into the branched passage 324 and into the catalyst device 326. As noted above, this allows the catalyst device to remove the unburned hydrocarbons from the exhaust gases flowing therethrough and thus attenuate the production of smoke during idling.

Over the remaining range of throttle openings, indicated as range 404, the exhaust valve moves within approximate directly proportional relationship to the opening of the throttle valve. However, it is conceived that other relationships could also be used.

FIG. 14 includes a graph illustrating a relationship between the flow rate of exhaust gases out of the combustion chambers 118, 120, plotted on the vertical axis, and the throttle opening, plotted on the horizontal axis. The graph in FIG. 14 includes three plots, the first plot 406 which illustrates the total flow of exhaust gases out of the exhaust manifold 302, a second plot 408 which illustrates the flow of exhaust gases into the branched exhaust passage 324, and a third plot 410 which illustrates the flow of exhaust gases out of the exhaust pipes 314, 316.

Over the range of throttle openings identified by the numeral 402, as noted above, the exhaust valve shaft 338 does not rotate due to the movement of the pin 394 (FIG. 12) within the grove 392. Thus, over the range 402, the plots 406 and 408 are identical, indicating that all or substantially all of the exhaust gases flowing out of the exhaust manifold 302 are diverted into the branched passage 324 and through the catalyst device 326.

Over the range of throttle openings 404, the exhaust valve shaft 338 begins to rotate due to the contact of the pin 394 (FIG. 12) with the end of the slot 392 and a continued movement of the lever 388 in the direction of the arrow B. As illustrated by the plots 406, 408 and 410, as the throttle valve 130 is opened, the flow of exhaust gases through the exhaust pipes 314, 316 increases and approaches the total volume of exhaust gases represented by the plot 406. Accordingly, the amount of exhaust gases diverted into the branched passage 324 decreases.

FIG. 15 is a graph illustrating the temperature at the outlet of the catalyst device 326, e.g., the temperature sensed by the temperature sensor 330 (lower left-hand portion of FIG. 3) as it relates to the opening of the exhaust valves 334, 336. The exhaust valve opening is plotted on the vertical axis and the outlet temperature of the catalyst device is plotted on the horizontal axis.

Generally, during the operation of the engine 72, the outlet temperature of the catalyst device 326 will remain in the range identified by the numeral 412, of about 300 to 800° C., regardless of the opening amount of the exhaust valves 334, 336. If, however, the outlet temperature of the catalyst reaches 900° C., it is likely that an abnormality has occurred, such as, for example, a blockage in a cooling jacket in the vicinity of the catalyst assembly 322. Thus, as suggested by the line identified as numeral 414, the exhaust valves 334, 336 preferably are moved to their fully opened position, regardless of the throttle position. Thus, in the embodiment illustrated in FIG. 3, the ECU 144 monitors the temperature of the catalyst via the sensor 320. The ECU 144 is configured to control the motor 340, via the control line 342, to rotate the exhaust valve shaft 338 to the fully opened position if the temperature transmitted to the ECU 144 by the sensor 330 reaches or exceeds 900° C. With reference to FIG. 12, if the outboard motor 70 is provided with the cooling assembly 384, another device can be provided which moves the exhaust valve shaft 338 to the fully opened position when the catalyst outlet temperature reaches or exceeds 900° C.

With reference to FIG. 16, a modification of the outboard motor 70 is illustrated schematically therein and includes a modification of the exhaust system 296, indicated by the referenced numeral 296A. The components of the exhaust system 296A can be the same as those components of the exhaust system 296 illustrated in FIGS. 3 and 4 except as noted below. The corresponding elements is the same reference numerals except that a "A" has been added.

As shown in FIG. 16, the exhaust system 296A includes a low speed exhaust discharge portion 420A. The low speed exhaust discharge portion 420A includes a low speed exhaust discharge passage 422A having an inlet end 424A communicating with the expansion chamber 318A and an outlet end 426A. The inlet end 424A is formed on a lower surface of the exhaust guideplate 318A so as to be above the water line WL. The passage 422A extends upwardly from the inlet 424A through in inverted U-shaped portion 428A. The U-shaped portion 428A has an outlet end 430A which is also formed in a lower surface of the exhaust guideplate 318A. The outlet end 430A is connected to an inlet end 432A of a downstream discharge passage 434A.

The discharge passage 434A extends downwardly from the inlet end 432A in a U-shaped configuration and terminates at the discharge 426A above the water line WL. As shown in FIG. 16, a portion of the downstream passage 434A extends below the water line WL. Thus, at least during idling, the downstream passage 434A is cooled by the water within the water wall 320A.

As noted above, during idling, the valves 334A, 336A, are closed so as to divert substantially all of the exhaust gases flowing through the main exhaust passages 308A, 310A into the branched passage 324A. The exhaust gases flowing into the branched passage 324A pass through the catalyst device 326A and into the expansion chamber 318A through the return exhaust passage 328A. When the outboard motor 70A is idling, water line WL is at a sufficient height within the expansion chamber 318A to cause some back pressure against the flow of exhaust toward the lower casing 86. Thus, exhaust gases flowing into the expansion chamber 318A through the return exhaust passage 328A can pass into the low speed exhaust gas discharge 420A and out through the discharge 426A. Additionally, when the outboard motor 70A is operating at low speed, although the water line may drop to water line WL2, such water can still cause sufficient back pressure to divert exhaust gases into the low speed discharge 42A.

As noted above, when the outboard motor 70A is operating at high speed, the valves 334A, 336A, are opened fully, thus allowing substantially all of the exhaust gases to flow into the expansion chamber 318A through the main exhaust passages 308A, 310A. During such high speed operation, the water line drops even further and the speed of the propeller 88A and the flow of exhaust gases through the expansion chamber 318A causes most of the exhaust gases to be discharged from the discharge passage 319A and the propeller 88A.

With reference to FIG. 17, another modification of the exhaust system 296 is illustrated therein and referred to generally by the reference numeral 296B. The components of the exhaust system 296B can be the same as those of the exhaust system 296 and/or 296A except as noted below. The same reference numerals are used to identify corresponding components, except that a "B" has been added.

As shown in FIG. 17, the catalyst assembly 322B includes an exhaust return passage 440B which extends downwardly from the catalyst device 326B to a first outlet 442B which terminates within the water wall 320B. Additionally, the return passage 440B includes a second outlet 444B which terminates in a side wall of expansion chamber 318B. Thus, during idle and low speed operation, exhaust gases are discharged from catalyst device 326B and through at least one of the outlet ends 442B, 444B, thereby discharging exhaust gases into the expansion chamber 318B and/or the water wall 320B.

With reference to FIG. 18, a further modification of the exhaust system 296 is illustrated therein and referred to generally by the reference 296C. The components of the exhaust system 296C can be the same as those included in the exhaust systems 296, 296A, and/or 296B, except as noted below. The same reference numerals have been used to designate corresponding components, except that a "C" has been added.

As shown in FIG. 18, the catalyst assembly 322C includes an exhaust return passage 450C, which extends from the outlet of the catalyst device 326C back to the main exhaust passages 308C, 310C, downstream from the valves 334C, 336C. As noted above, a portion of the main passages 308C, 310C, are formed by apertures 362C, 364C, defined in the exhaust guideplate 318C.

By configuring the return passage 450C to extend from the catalytic device 326C back to the main exhaust passages 308C, 310C, the catalyst arrangement 322C can be added to an outboard motor without having to alter the inlet end of the expansion chamber 318C.

With reference to FIG. 19, yet another modification of the exhaust system 296 is illustrated therein and referred to generally by the reference numeral 296D. The components of the exhaust system 296D can be the same as those included in exhaust system 296, 296A, 295B, and/or 296C, except as noted below. The same reference numerals have been used to identify corresponding components, except that a letter "D" has been added.

As shown in FIG. 19, the catalyst assembly 322D includes a branched passage 460C extending from the main exhaust passages 308D, 31 OD, upstream from the valves to the catalyst device 326D. A return passage 462D extends from the catalyst device 326D to the U-shaped portion 428D of the low speed discharge 420D.

With reference to FIG. 20, another modification of the exhaust system 296 is illustrated therein and referred to generally by the reference numeral 296E. The exhaust system 296E can include the same components as the exhaust systems 296, 296A, 296B, 296C, and/or 296D, except as noted below. The same reference numerals have been used to identify corresponding components, except that a letter "E" has been added.

As shown in FIG. 20, the catalyst assembly 322E includes a branched passage 460E which extends from the main passage 308E, 310E. However, as shown in FIG. 20, the main passages 308E, 310E, do not include an exhaust valve. Rather, as noted above with respect to the lower left-hand portion of FIG. 3, the back pressures created by the level of water within the expansion chamber 318E can be relied on for diverting exhaust gases into the branched passage 460E during idle and low speed operation.

With reference to FIG. 21, yet another modification of the exhaust system 296 is illustrated therein, and referred to generally by the reference numeral 296F. The exhaust system 296F can include the same components as the exhaust systems 296, 296A, 296B, 296C, 296D, and/or 296E, except as noted below. The same reference numerals have been used to identify corresponding components except that a "F" has been added.

As shown in FIG. 21, the catalyst assembly 322F includes an exhaust discharge passage 470F which extends from the catalyst device 326F directly to a discharge 472F disposed on an outer surface of the exhaust guideplate 318F. As such, idle and low speed exhaust gases are discharged directly from the catalyst device 326F.

With reference to FIG. 22, a further modification of the exhaust system 296 is illustrated therein, and referred to generally by the reference numeral 296G. The exhaust system 296G can include the same components as the exhaust systems 296, 296A, 296B, 296C, 296D, 296E, and/or 296F, except as noted below. The same reference numerals have been used to identify corresponding components, except that a "G" has been added.

As shown in FIG. 22, the exhaust system 296G is essentially the same as the exhaust system 296F except that the valves 334F, 336F have been eliminated. As noted above, in this embodiment, the water levels within the expansion chamber 318G can be relied upon for diverting exhaust gases through the catalyst assembly 322G.

With reference to FIG. 23, another modification of the exhaust system 296 is illustrated therein and referred to generally by the reference numeral 296H. The exhaust system 296H can include the same components as the exhaust systems 296, 296A, 296B, 296C, 296D, 296E, 296F, and/or 296G, except as noted below. The same reference numerals have been used to identify corresponding components, except that a "H" has been added.

As shown in FIG. 23, the catalyst assembly 322H includes a return passage 480H which extends from the catalytic device 326H directly to the water wall 320H.

With reference FIG. 24, a final modification of the exhaust system 296 is illustrated and referred to generally by the reference numeral 296I. The exhaust system 296I can include the same components as the exhaust system 296, 296A, 296B, 296C, 296D, 296E, 296F, 296G, and/or 296H, except as noted below. The same reference numerals have been used to identify corresponding components, except that a "I" has been added.

As shown in FIG. 24, catalyst device 322I includes a return passage 480I similar to the passage 480H illustrated in FIG. 23. However, as shown in FIG. 24, the valves 334H and 336H have been eliminated. Thus, the water level within the expansion chamber 318I can be relied upon for diverting exhaust gases into the branched passage 324I.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations and aspects of the invention have been shown and described in detail, other modifications, which are within the scope of the invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope the present invention herein disclosed should not be limited by the particular disclosed embodiments described above, but should be determined only by a fair reading of the claims that follow.

What is claimed is:

1. An outboard motor comprising an internal combustion engine and a propulsion unit driven by the engine, the engine including an engine body defining a plurality of combustion chambers therein, and an exhaust system comprising an exhaust manifold defining a plurality of exhaust runners communicating with the combustion chambers, a merging portion in which the exhaust runners merge, and a common exhaust passage which receives exhaust gases from the merging portion, the common exhaust passage communicating with an expansion chamber configured to quiet exhaust noises traveling through the common exhaust passage, a valve disposed in the common exhaust passage and controlling a flow of exhaust gases therethrough, a catalytic treatment passage branched from the common exhaust passage at a position upstream from the valve, the catalytic treatment passage extending from the common exhaust passage to a catalytic treatment device so as to guide exhaust gases from the common exhaust passage upstream from the valve into the catalytic device, a throttle device configured to control the flow of air into the combustion chambers, a linkage arrangement connecting the throttle device to the valve so as to control movement of the valve proportionally to a movement of the throttle device, the linkage arrangement being configured to bias the valve to a closed position when the throttle device is in a position corresponding to an idle speed of the engine.

2. The outboard motor according to claim 1 additionally comprising a low speed exhaust discharge and a high-speed exhaust discharge, the exhaust system configured to discharge substantially all of the exhaust gases flowing therethrough through the low speed exhaust discharge when the engine is operating at an idle engine speed and to discharge substantially all of the exhaust gases flowing therethrough through the high-speed exhaust discharge when the engine is operating at a maximum engine speed.

3. The outboard motor according to claim 1 additionally comprising an exhaust guide plate, the engine being supported by the exhaust guide plate, the valve being disposed in the exhaust guide plate.

4. An outboard motor comprising an internal combustion engine driving a propulsion device, the internal combustion engine comprising an engine body defining at least one combustion chamber and an exhaust manifold configured to guide exhaust gases from the combustion chamber to an exterior of the engine body, a main exhaust passage extending from the exhaust manifold, the main exhaust passage including an outlet end communicating with an expansion chamber, a branched exhaust passage extending from the main exhaust passage at a position upstream from the outlet end, and a catalytic device, the branched passage connecting the catalytic device with the main exhaust passage, and the catalytic device not being within either of the main exhaust passage or expansion chamber.

5. The outboard motor according to claim 4 additionally comprising a valve disposed in the main passage for controlling a flow of exhaust gas therethrough and a linkage assembly connecting the valve to a user movable device.

6. The outboard motor according to claim 5 additionally comprising a throttle device configured to control a flow of air into the combustion chamber, the user movable device being the throttle device.

7. The outboard motor according to claim 4 additionally comprising an exhaust guide plate supporting the engine, the catalytic device being disposed in the exhaust guide plate.

8. The outboard motor according to claim 4 additionally comprising a third exhaust passage extending from an outlet of the catalytic device to a portion of the main exhaust passage downstream from the valve.

9. The outboard motor according to claim 4 additionally comprising a lower unit housing enclosing the expansion chamber and a third exhaust passage connecting an outlet of the catalytic device within interior of the expansion chamber and with a space defined between the housing and an exterior of the expansion chamber.

10. The outboard motor according to claim 4 additionally comprising a low speed exhaust gas discharge conduit extending from the expansion chamber to a discharge disposed above a waterline of the outboard motor when the outboard motor is connected to a watercraft which is at rest, and a third exhaust passage connected an outlet of the catalytic device, the third exhaust passage being configured to discharge exhaust gases flowing therethrough to the atmosphere.

11. The outboard motor according to claim 10, wherein at least one of the branched exhaust passage and the catalytic device are configured such that a majority of exhaust gases flowing through the main exhaust passage, flow into the expansion chamber through the outlet end of the main exhaust passage when the engine operates at an engine speed above a predetermined engine speed.

12. The outboard motor according to claim 10 additionally comprising a valve disposed in the main exhaust passage downstream from the branched passage, the valve being configured to control a flow of exhaust gas through the outlet of the main exhaust passage.

13. The outboard motor according to claim 10, wherein the third exhaust passage connects the outlet of the catalytic device with a portion of the low speed exhaust discharge conduit at a point downstream from the expansion chamber.

14. The outboard motor according to claim 10 additionally comprising a third exhaust discharge disposed above a waterline, the third exhaust passage connecting the outlet of the catalytic device with the third exhaust discharge.

15. The outboard motor according to claim 4, additionally comprising an exhaust guide plate supporting the engine, the main exhaust passage passing through the exhaust guide plate, the branched exhaust passage extending from a portion of the main exhaust passage within the exhaust guide plate.

16. An outboard motor comprising an internal combustion engine driving a propulsion device, the engine including an engine body defining at least one combustion chamber therein, and an exhaust system comprising a main exhaust passage and an expansion chamber, the main exhaust passage including an inlet end communicating with the combustion chamber and an outlet end communicating with the expansion chamber, an exhaust guide plate supporting the engine above the expansion chamber, the main exhaust passage extending through the exhaust guide plate, and an exhaust valve supported by the exhaust guide plate and configured to control a flow of exhaust gases through the main exhaust passage.

17. The outboard motor according to claim 16 additionally comprising a catalytic device and a branched exhaust passage connecting the catalytic device with a portion of the exhaust passage upstream from the outlet end.

18. The outboard motor according to claim 16, wherein the exhaust valve is configured to close the main exhaust passage when the engine is operating at an idle speed.

19. The outboard motor according to claim 16 additionally comprising a valve drive mechanism configured to, at least in a first mode, change an opening of the exhaust valve in accordance with a value of a user changeable parameter.

20. The outboard motor according to claim 19 additionally comprising a throttle valve configured to control a flow of air to the combustion chamber, wherein the user changeable parameter is a position of the throttle valve.

21. The outboard motor according to claim 20, wherein the valve drive mechanism comprises a linkage assembly connecting the throttle valve to the exhaust valve.

22. The outboard motor according to claim 20, wherein the valve drive mechanism comprises a motor.

23. The outboard motor according to claim 19, wherein the valve drive mechanism is configured to, in a second mode, open the exhaust valve when the catalyst device is overheated, despite the position of the user changeable parameter.

* * * * *